United States Patent [19]
Koda et al.

[11] Patent Number: 6,090,744
[45] Date of Patent: Jul. 18, 2000

[54] CATALYST FOR CLEANING EXHAUST GAS

[75] Inventors: Yuki Koda; Satoshi Ichikawa, both of Hiroshima; Hiroshi Yamada, Hatsukaichi; Kenichi Yamamoto, Higashihiroshima; Kenji Okamoto, Hiroshima; Toshitsugu Ueoka, Higashihiroshima; Hiroshi Murakami, Hiroshima; Takashi Takemoto, Higashihiroshima; Kazuo Misonoo, Hiroshima; Masahiko Shigetsu, Higashihiroshima; Taeko Shimizu, Hiroshima, all of Japan

[73] Assignee: Mazda Motor Corporation, Hiroshima-Ken, Japan

[21] Appl. No.: 08/828,029

[22] Filed: Mar. 27, 1997

[30] Foreign Application Priority Data

Mar. 28, 1996 [JP] Japan .................... 8-074279
Mar. 28, 1996 [JP] Japan .................... 8-074283
Mar. 12, 1997 [JP] Japan .................... 9-057483
Mar. 12, 1997 [JP] Japan .................... 9-057485

[51] Int. Cl.$^7$ .............................. B01J 23/10; B01J 23/40
[52] U.S. Cl. .................... 502/304; 502/302; 502/326; 502/327; 502/332; 502/333; 502/334; 502/339
[58] Field of Search .................... 502/302, 304, 502/326, 327, 332, 333, 334, 339

[56] References Cited

U.S. PATENT DOCUMENTS

| | | | |
|---|---|---|---|
| 4,839,146 | 6/1989 | Cho et al. ............... | 423/213.5 |
| 5,248,650 | 9/1993 | Sekiba et al. ........... | 502/303 |
| 5,254,519 | 10/1993 | Wan et al. ............. | 502/252 |
| 5,556,825 | 9/1996 | Shelef et al. .......... | 502/303 |
| 5,597,771 | 1/1997 | Hu et al. .............. | 502/304 |
| 5,884,473 | 3/1999 | Noda et al. ........... | 60/274 |

FOREIGN PATENT DOCUMENTS

| | | |
|---|---|---|
| 1-281144 | 11/1989 | Japan . |
| 4-72577 | 11/1992 | Japan . |
| 5-184876 | 7/1993 | Japan . |

*Primary Examiner*—Walter D. Griffin
*Attorney, Agent, or Firm*—Nixon Peabody LLP; Donald R. Studebaker

[57] ABSTRACT

In the exhaust gas purifying catalyst (3), palladium is contained as a catalytic component and cerium oxide and (Ce, Pr) compound oxide is contained as a promoter. Now, the weight ratio of cerium oxide to (Ce, Pr) compound oxide is set between 9/1 and 7/3, and the ratio of praseodymium to cerium in the (Ce, Pr) compound oxide is set between 3 mol % and 50 mol %. In this way, because in this exhaust gas purifying catalyst (3), palladium with high low-temperature activity is used for a catalytic component, the exhaust gas purifying performance at low temperature is improved. And because cerium oxide and (Ce, Pr) compound oxide improves catalytic activity of palladium at high temperature, the exhaust gas purifying performance at high temperature, in particular, NOx purifying performance, is improved.

19 Claims, 22 Drawing Sheets

PEELING TEST CONDITION : ULTRA SONIC PEELING TEST METHOD(3h)
PEELING RATIO CALCULATION METHOD : x=DRY WEIGHT BEFORE THE TEST(g)
y=DRY WEIGHT AFTER THE TEST(g)
PEELING RATIO (%)=(x-y)/x×100
CATALYST SHAPE CONDITION : 1inch φ ×50mm
6mil/400cpsi
CATALYST PRE-TREATMENT CONDITION : 1000°C×24h(AIR)

EVALUATED VEHICLE : 1.5L、4-CYLINDER ENGINE
EM EVALUATION MODE : FTP
CATALYST POSITION : DIRECT DOWNSTREAM POSITION
OF THE MANIFOLD JUNCTION
CARRIER CONDITION : 4m ,600cpi, $\phi$93mm
CATALYST PRE-TREATMENT CONDITION : 1000°C×24h(AIR)
※CO DISCHARGE ; ×10

CATALYST FOR CLEANING EXHAUST GAS

BACKGROUND OF THE INVENTION

1. Field of the Invention

The present invention relates to a catalyst for cleaning exhaust gas and manufacturing method thereof, and in p particular, to a catalyst for cleaning exhaust gas with excellent low-temperature and high-temperature cleaning performance as well as excellent heat resistance, which can simultaneously remove HC, CO and NOx in exhaust gas discharged from automotive engines.

2. Description of the Prior Art

In general, because the exhaust gas discharged from automotive engines contains atmospheric pollutants such as HC (hydrocarbon), CO (carbon monoxide), NOx (nitrogen oxides), etc., regulations on exhaust gas has been strengthened worldwide in recent years. In particular, in the State of California, USA where air pollution causes serious social problems, the corporate average NMOG regulations have been introduced and the regulation level of the exhaust gas has been strengthened stepwise, but in order to cope with these regulations, low-pollution vehicles such as LEV or ULEV must be introduced into the market (to be introduced stepwise from year 1997 to year 2000).

In this way, to the exhaust system of automotive engines, generally, an exhaust gas purification device (catalyst converter) using catalyst for purifying exhaust gas is installed for purifying exhaust gas. For such catalysts for purifying exhaust gas, conventionally, noble metal catalysts such as platinum, rhodium, etc. supported by a porous catalyst substrate such as alumina, etc. have been popularly adopted.

Now, the exhaust gas purifying catalysts using noble metal catalysts such as platinum, rhodium, etc. have drawbacks of low catalytic activity at low temperature. Consequently, when exhaust gas temperature is low, for example, right after the engine begins to start, there is a problem that the engine emission performance is degraded because temperature of the exhaust gas purifying catalyst is not sufficiently high. Therefore, in recent years, exhaust gas purifying catalysts using palladium with high catalytic activity at low temperature for a catalytic component have been proposed (for example, see Japanese Non-examined Patent Publication No. Hei 5-184876, Japanese Patent Publication No. Hei 4-72577, and Japanese Non-examined Patent Publication No. Hei 1-281144).

However, conventional exhaust gas purifying catalyst using palladium as a catalytic component provides a high catalytic activity at low temperature but has problems in that catalytic activity of CO or NOx at low temperature is low and in that NOx purifying performance at high temperature is low. Particularly, in recent years, in automotive engines, the exhaust gas purifying device tends to be located in the upstream portion of the exhaust gas passage, in order to rapidly increase temperature of the exhaust gas purifying catalyst after the engine begins to start. And locating the exhaust gas purifying device in the upstream portion of the exhaust passage in this way causes the temperature of the exhaust gas purifying catalyst to increase under normal condition, giving a rise to a problem in that the NOx purifying performance becomes even lower in particular at high temperature.

SUMMARY OF THE INVENTION

This invention has been made to solve the above conventional problems, and has an object to provide an exhaust gas purifying catalyst and a manufacturing method thereof which can improve the exhaust gas purifying performance at low temperature right after the engine begins to start, etc. for not only HC but also CO and NOx and at the same time improve the NOx purifying performance at high temperature. This invention also intends to solve the above problems without lowering heat resistance of the exhaust gas purifying catalyst.

This invention is a technique which can remarkably improve the performance of the exhaust gas purifying catalyst and can cope with the toughened emission regulations in the US. In particular, it is a technique that can not only greatly improve the catalytic performance for HC as well as CO or NOx in the low temperature region where exhaust gas is used to be discharged to atmosphere without purifying because exhaust gas purifying catalyst is not activated in the exhaust gas mode measurement of vehicles, for example, right after the engine begins to start, but also can remarkably improve the catalytic performance for NOx in the high temperature region, thereby achieving a materialization of LEV, ULEV vehicles.

The technique according to this invention has been developed primarily to meet the conditions of the US as described above, and has a premise to be applied to LEV, ULEV applicable vehicles, but it shall not be limited to the application to LEV, ULEV applicable vehicles. That is, the exhaust gas purifying catalyst according to this invention can be satisfactorily adopted to vehicles for meeting the conventional EM regulations because the low-temperature activity is remarkably improved in this way as well as the catalytic performance in the high temperature region has also been greatly improved. In this case, it is possible to have an advantage of cost reduction for the exhaust gas purifying catalyst.

In addition, the technique according to this invention can be utilized irrespective of automobile engine types (for example, it is possible to be applied to vehicles containing a diesel engine). It is not only applied to automobiles but also is possible to be applied to exhaust gas purifying devices of high-temperature combustion equipment, etc. such as boilers, etc. In this case, it exhibits marvelous effects in NOx purification particularly in the high-temperature region of the purified gas.

In general, for improving the low-temperature activity of the exhaust gas purifying catalyst, there exist various approaches. As after-treatment after the combustion equipment, examples include adoption of electrically heated catalysts, introduction of adsorption purifying catalyst to the exhaust gas component such as HC, etc. at the time of low temperature, development of palladium-based low-temperature active catalyst, etc. In particular, presently, the palladium-based low-temperature active catalyst, a mainstream of the low-temperature active catalysts, quickly starts catalyst reactions from the low-temperature region, and possesses triple purification performance which can simultaneously purify HC, CO and NOx. However, the conventional palladium-based low-temperature active catalyst provides excellent HC oxidizing performance from low temperature but has a problem in that it provides low purifying performance of CO or NOx at low temperature as well as low NOx purifying performance (NOx reducing performance) in a high temperature region (400° C. or higher), and as a result, it has a problem that the exhaust gas purifying window on the lean side becomes extremely narrow. With respect to this problem, investigation has been made to meet with a technique for optimizing the support rate and ratio using rhodium activated species, but rhodium is expensive and it is assumed that high effects are unable to be achieved. However, according to the technique of this invention, all these problems can be solved.

Specifically, according to the first aspect of the present invention, there is provided an exhaust gas purifying catalyst supporting palladium, including cerium oxide ($CeO_2$) and compound oxide of cerium (Ce) and praseodymium (Pr) (hereinafter called "(Ce, Pr) compound oxide" or "(Ce, Pr)$O_2$."

In the exhaust gas purifying catalyst, because palladium with high low-temperature activity is used as a catalytic component, the exhaust gas purifying capabilities are improved at low temperature such as right after the engine begins to start. Because cerium oxide and (Ce, Pr) compound oxide improve the catalytic activity of palladium, exhaust gas purifying performance at high temperature, in particular, NOx purifying performance are improved. It can exhibit the above-mentioned effects while improving high-temperature heat resistance. In this specification, simply saying the "exhaust gas purifying performance" means comprehensive purifying performance for HC, CO and NOx.

In the exhaust gas purifying catalyst, the weight ratio of cerium oxide (Ce, Pr) compound oxide is preferably 9/1 (9:1) or less. In this case, NOx purifying performance of the exhaust gas purifying catalyst at high temperature is still more improved.

In the exhaust gas purifying catalyst according to the first aspect, the weight ratio of cerium oxide to (Ce, Pr) compound oxide is preferably 7/3 (7:3) or more. Doing so could particularly improve CO purifying performance of the exhaust gas purifying catalyst at high temperature.

In addition, in the exhaust gas purifying catalyst according to the first aspect, the weight ratio of oxide cerium to (Ce, Pr) compound oxide is more suitably between 9/1 (9:1) and 7/3 (7:3). In this event, the NOx purifying performance and CO purifying performance of the exhaust gas purifying catalyst at high temperature are particularly improved and at the same time, the exhaust gas purifying performance at low temperature is still more improved.

In each of the above exhaust gas purifying catalysts, the ratio of praseodymium to cerium in the (Ce, Pr) compound oxide is preferably between 3 and 50 mol %. Doing like this could particularly improve the NOx purifying ratio of the exhaust gas purifying catalyst.

The above ratio is preferably between 3 and 20 mol %. Doing like this could further improve exhaust gas purifying performance at low temperature for HC and CO (for example, T50 temperature) and at the same time, further improve the NOx purifying ratio. The above ratio is more suitably between 5–20 mol %. Doing like this, NOx purifying performance can be further improved. The above ratio is more suitably between 5 and 7 mol %. Doing like this, exhaust gas purifying performance at low temperature (for example, T50 temperature) for HC, CO and NOx could be further improved.

In the above exhaust gas purifying catalyst, in place of the (Ce, Pr) compound oxide, the compound oxide of cerium and terbium (Tb) (hereinafter called "(Ce, Tb) compound oxide" or "(Ce, Tb) $O_2$") may be used. In this case, nearly similar actions and effects can be obtained as in the case of the exhaust gas purifying catalyst using the (Ce, Pr) compound oxide.

In the above exhaust gas purifying catalyst, the content of impurities is preferably less than 1 wt %. In this event, the exhaust gas purifying performance of the exhaust gas purifying catalyst can be further improved.

According to the second aspect of the present invention there is provided an exhaust gas purifying catalyst containing noble metal except palladium (Pd) as a catalytic component, including compound oxide of cerium (Ce) and praseodymium (Pr), wherein the compound oxide is located so as to prevent close contact with the noble metal. Hereupon, it is preferable that the noble metal is rhodium (Rh). In this exhaust gas purifying catalyst, it is preferable that the catalytic component includes platinum and rhodium and the compound oxide is located in such a manner to prevent close contact with at least one of platinum and rhodium. That is, in these exhaust gas purifying catalysts, rhodium is an essential catalytic component, and it is preferable to contain platinum in addition to this rhodium.

In this exhaust gas purifying catalyst, basically, since the (Ce, Pr) compound oxide improves the catalytic activity of catalytic component, exhaust gas purifying performance at low temperature is improved and at the same time, exhaust gas purifying performance at high temperature, in particular, NOx purifying performance, is improved. In general, locating (coexisting) platinum and rhodium close to the (Ce, Pr) compound oxide lowers catalytic activities of platinum and rhodium. However, in this exhaust gas purifying catalyst, even when (Ce, Pr) compound oxide contains platinum and rhodium, the catalyst is located to prevent close contact with at least either one of them, and therefore, the lowering of the catalytic activity can be prevented. In this specification, simply saying the "exhaust gas purifying performance" means comprehensive purifying performance for HC, CO, and NOx.

In this exhaust gas purifying catalyst, a plurality of catalyst layers, each containing a catalytic component, are provided, and it is preferable that while the (Ce, Pr) compound oxide is being contained in the first catalyst layer in the said catalyst layers, at least one of platinum and rhodium is contained in the second catalyst layer of the catalyst layers. In this case, because the (Ce, Pr) compound oxide is located definitely apart from at least one of platinum and rhodium, lowering of catalytic action of platinum and/or rhodium can be definitely prevented, and exhaust gas purifying performance of the exhaust gas purifying catalyst at low temperature and high temperature can further be improved.

In the exhaust gas purifying catalyst containing the first and the second catalyst layers, it is preferable that palladium is contained in the first catalyst layer as a catalytic compound. In this case, since palladium with high low-temperature activity is used for a catalytic component in the first catalyst layer, exhaust gas purifying performance at low temperature, such as right after the engine begins to start, is improved. And since the (Ce, Pr) compound oxide increases catalytic activity of palladium at high temperature, exhaust gas purifying performance, in particular, NOx purifying performance at high temperature is improved. Even if the (Ce, Pr) compound oxide coexists with palladium, the catalytic activity of the palladium does not degrade.

In each of the exhaust gas purifying catalysts containing the first and the second catalyst layers, it is preferable that alumina is contained as substrate in the first and the second catalyst layers and the alumina content of the second catalyst layer is designed to be smaller than that of the first catalyst layer. In this case, particularly exhaust gas purifying performance at low temperature and NOx purifying performance at high temperature are still more improved. In the exhaust gas purifying catalyst containing the first and the second catalyst layers, it is preferable that alumina is contained in the first and the second catalytic layers as substrate, and the alumina content of the second catalyst layer is between 25 and 50 wt %. In this event, durability or heat resistance of the exhaust gas purifying catalyst is improved and peeling of the catalyst layer is prevented.

In each of the exhaust gas purifying catalysts containing the first and the second catalyst layers, the first catalyst layer is preferably located on the lower layer side and the second catalyst layer located on the higher layer side. In general, palladium is likely to be poisoned by catalytic poisons such as sulfur content, etc. in exhaust gas. However, in such event, because the entry of the catalytic poison in the exhaust gas into the lower layer catalyst layer is prevented by the upper layer catalyst layer, palladium in the lower catalyst layer is not poisoned.

In each of the above exhaust gas purifying catalysts with alumina contained in each catalyst layer, the catalytic component is preferably supported by the relevant alumina, respectively. In this case, contact of the catalytic component with exhaust gas is promoted and exhaust gas purifying performance of the exhaust gas purifying catalyst is still more improved.

According to the third aspect of the present invention, there is provided an exhaust gas purifying catalyst including the first catalyst layer containing active metal as a catalytic component and the second catalyst layer containing at least one of platinum and rhodium as a catalytic component, wherein a mixture of cerium compound and praseodymium compound is contained only in the first catalyst layer.

In the exhaust gas purifying catalyst according to the third aspect, basically, because the catalytic activity of active metal in the first catalyst layer is reinforced by a mixture of cerium compound and praseodymium compound, exhaust gas purifying performance at low temperature of the exhaust gas purifying catalyst is improved, and at the same time, the exhaust gas purifying performance, in particular, NOx purifying performance is improved. Because cerium compound and praseodymium compound and platinum and/or rhodium do not exist in the same catalyst layer, the catalytic activity of platinum and/or rhodium can be prevented from lowering, possibly improving further exhaust gas purifying performance of the exhaust gas purifying catalyst.

Now, in the exhaust gas purifying catalyst, the content of impurity is preferably less than 1 wt %. In this event, exhaust gas purifying performance of the exhaust gas purifying catalyst is still more improved.

According to the fourth aspect of the present invention there is provided a manufacturing method of an exhaust gas purifying catalyst supporting palladium, including a step of allowing a porous base material (substrate) to support palladium, a step of preparing a slurry containing the base material supporting the palladium, cerium oxide, and compound oxide of cerium and praseodymium as a solid content, and a step of firing the slurry to form exhaust gas purifying catalyst.

According to the fifth aspect of the present invention there is provided a manufacturing method for an exhaust gas purifying catalyst supporting palladium, including a step of mixing porous base material (substrate) with cerium oxide to form base material mixture, a step of allowing the base material mixture to support palladium, a step of preparing slurry containing the base material mixture supporting palladium, compound oxide of cerium and praseodymium as a solid content, and a step of firing the slurry to form exhaust gas purifying catalyst.

By the manufacturing method according to the fourth and the fifth aspects of the present invention, the exhaust gas purifying catalyst containing cerium oxide and (Ce, Pr) compound oxide and using palladium as a catalyst component can be easily obtained. And in the exhaust gas purifying catalyst manufactured in this way, exhaust gas purifying performance at low temperature, such as right after the engine begins to start, etc., is improved, and at the same time, exhaust gas purifying performance at high temperature, particularly, NOx purifying performance, can be improved by cerium oxide and (Ce, Pr) compound oxide.

In each of the above manufacturing methods, it is preferable to produce (Ce, Pr) compound mixture by coprecipitating the aqueous nitrate solution of cerium with the aqueous nitrate solution of praseodymium. In this event, it becomes easy to adjust or set the ratio of cerium to praseodymium in the (Ce, Pr) compound oxide.

According to the sixth aspect of the present invention, there is provided a manufacturing method of an exhaust gas purifying catalyst including a step of forming a lower catalyst layer containing palladium on a carrier surface as a catalytic component as well as a compound oxide of cerium and praseodymium and a step of forming an upper catalyst layer containing at least one of platinum and rhodium on the lower catalyst layer surface as a catalytic component as well as containing cerium oxide. In this manufacturing method of exhaust gas purifying catalyst, in the step for forming the upper catalyst layer, it is preferable to form the upper catalyst layer by coating the surface of the lower catalyst layer with a slurry containing cerium oxide which supports at least one of platinum and rhodium.

According to the manufacturing method, it is possible to easily obtain an exhaust gas purifying catalyst equipped with the lower catalyst layer containing (Ce, Pr) compound oxide, a promoter for the catalytic component palladium, and the upper catalyst layer containing cerium oxide, a promoter with catalytic components platinum and/or rhodium. Because in the exhaust gas purifying catalyst obtained in this way, palladium with high low-temperature activity is used for the lower catalyst layer, exhaust gas purifying performance at lower temperature, such as right after the engine begins to start, can be improved. And since (Ce, Pr) compound oxide improves palladium catalytic activity at high temperature, exhaust gas purifying performance at high temperature, in particular, NOx purifying performance is improved. In addition, because the upper catalyst layer does not contain (Ce, Pr) compound oxide, catalytic activity of platinum and/or rhodium is not lowered, possibly improving still further exhaust gas purifying performance of the exhaust gas purifying catalyst.

BRIEF DESCRIPTION OF THE DRAWINGS

Various characteristics and advantages of the present invention will be further described in details by the following preferred embodiments, referring now to attached drawings, wherein like reference characters designate like or corresponding parts throughout.

DETAILED DESCRIPTION OF THE PREFERRED EMBODIMENTS

Embodiment 1

Figure 2:
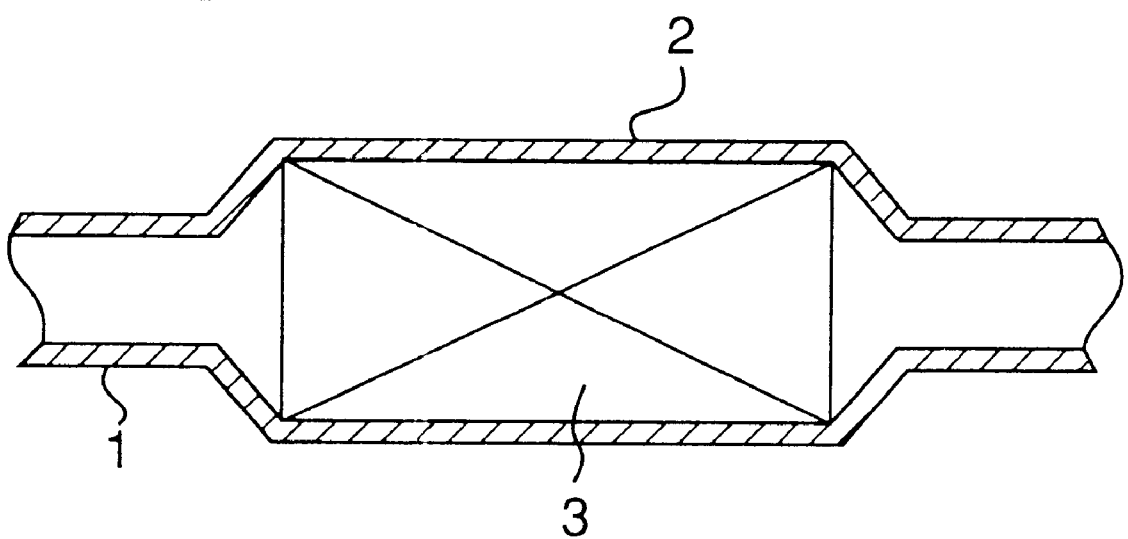
FIG. 2 is a longitudinal sectional view of an exhaust gas purifying device using the exhaust gas purifying catalyst shown in FIG. 1.

Now, embodiment 1 of the present invention is specifically described. As shown in FIG. 2, to the exhaust system 1 for discharging exhaust gas of an automotive engine (not illustrated), an exhaust gas purifying device 2 is intermediately placed, and to the inside of this exhaust gas purifying device 2, the exhaust gas purifying catalyst 3 for purifying air pollutants such as HC, CO, NOx, etc. in exhaust gas by decomposing them into $H_2O$, $CO_2$, $N_2$, etc. is filled.

Hereupon, the air-fuel ratio of the engine is set to a rich one (A/F=13 to 14), which is richer than the theoretical air-fuel ratio (A/F=14.7), for a predetermined period after the engine start. After the period has expired, the air-fuel is controlled so as to correspond to the theoretical air-fuel ratio by means of $O_2$ feedback control.

Now, the exhaust gas purifying device 2 is intermediately placed to the upstream portion, that is, the exhaust manifold, of the exhaust system 1. That is, this exhaust gas purifying device 2 is a directly connected type exhaust gas purifying device. Consequently, exhaust gas temperature introduced into the exhaust gas purifying device 2 becomes comparatively high, temperature increase of exhaust gas purifying catalyst 3 is promoted right after the engine begins to start, etc., and the exhaust gas purifying performance is improved. On the contrary, because temperature of exhaust gas purifying catalyst under normal operation tends to increase, improvement in exhaust gas purifying performance at high temperature is required.

Figure 1:
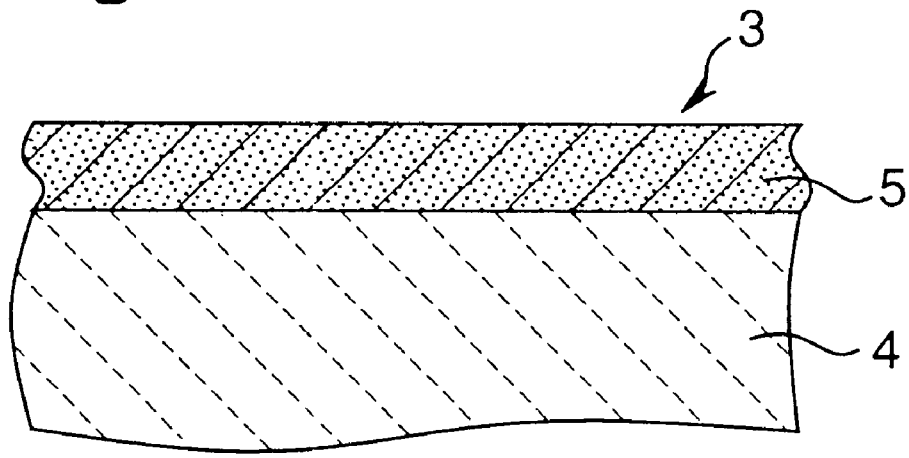
FIG. 1 is a longitudinal sectional view of an exhaust gas purifying catalyst according to the embodiment 1 of the present invention.

As shown in FIG. 1, in the exhaust gas purifying catalyst 3, a catalyst supporting layer 5 is formed (fixed) on the honeycomb-form carrier 4 made with Cordierite, material with excellent heat resistance. In this case, Cordierite is used for carrier material, but needless to say, the carrier material is not limited to Cordierite. In this exhaust gas purifying catalyst 3, a simple catalyst supporting layer 5 is formed on the carrier 4, but another catalyst supporting layer may be formed on the outside or inside or both sides of this catalyst supporting layer 5.

The catalyst supporting layer 5 has basically a construction in which palladium, a catalytic component (active specie), is supported by substrate, porous γ-alumina (γ-$Al_2O_3$). In this catalyst supporting layer 5, cerium oxide (Ceria) and (Ce, Pr) compound oxide are contained as promoters (OSC: oxygen storing component). In this (Ce, Pr) compound oxide, cerium and praseodymium have chemical bonding relation and crystallized. Now, the ratio of cerium to praseodymium can be optionally set. That is, if the chemical formula of the (Ce, Pr) compound oxide is expressed by $(Ce_{1-x}, Pr_x)O_2$, the value x is able to be optionally set within the range of 0–1. Cerium oxide and (Ce, Pr) compound oxide are merely physically mixed and no chemical bonding relation exists between the two.

Now, the manufacturing method of such exhaust gas purifying catalyst 3 is described as follows. That is, this exhaust gas purifying catalyst 3 is manufactured via the following steps.

(1) Heat treatment of γ-alumina

Expose pure γ-alumina powders in the 900° C. air for 50 hours to heat-treat the γ-alumina. By this treatment, heat stability of the γ-alumina is improved.

(2) Support of palladium

After physically mixing heat-treated γ-alumina and cerium oxide powders, add an aqueous solution of palladium compound (for example, dinitrodianine-palladium), active species, to this mixture dropwise to impregnate, and then, dry the mixture. In this way, a palladium supporting powder in which palladium, a catalytic component (active species), is supported on γ-alumina and cerium oxide is obtained.

(3) Synthesis of (Ce, Pr) compound oxide

After mixing the aqueous nitrate solution of cerium and aqueous nitrate solution of praseodymium, add ammonia to this mixture to cause coprecipitation. Then, wash and dry this precipitate; then, fire at temperature of about 600° C. With this procedure, (Ce, Pr) compound oxide powder is obtained. The mol ratio of cerium to praseodymium in this (Ce, Pr) compound oxide is preferably set in the range of about (99.9–70): (0.1–30).

(4) Preparation of slurry for wash-coat

Mix the palladium supporting powder, the (Ce, Pr) compound oxide powder, water, and binder (for example, hydrated alumina) to prepare slurry for wash-coat. In this slurry for wash-coat, the weight ratio of cerium oxide and (Ce, Pr) compound oxide is set to a specified range, for example, 9/1 (9:1)–7/3 (7:3).

(5) Wash-coat to the carrier

Immerse the honeycomb-form carrier comprising Cordierite in the slurry for wash-coat, and then, blow away an excess slurry. In this way, the carrier is coated with wash-coat slurry. And dry the carrier coated in this way at temperature of about 150° C., and then, fire at temperature of about 500° C. for about 2 hours. By doing so, an exhaust gas purifying catalyst is completed. In this exhaust gas purifying catalyst, the support volume with respect to the carrier I set to 33–40% of the carrier weight.

Now, comparing with that of exhaust gas purifying catalyst (comparison examples) manufactured by the conventional manufacturing method for comparison, the measured results of purifying performance of the exhaust gas purifying catalyst (this invention) according to this invention manufactured in this way are described. The exhaust gas purifying catalyst as a comparison example is manufactured by a similar method using cerium oxide only as a promoter as in the case of the exhaust gas purifying catalyst according to this invention. The weight of cerium oxide is same as that in the case of this embodiment (this invention).

The exhaust gas purifying performance of both exhaust gas purifying catalysts (activity evaluation) is evaluated under the following conditions using an atmospheric pressure fixed bed flow-through type reactor. That is, for the exhaust gas to be purified, a model gas with the following composition equivalent to the exhaust gas which corresponds to mixture air whose air-fuel ratio A/F is 14.7±0.9 (1 Hz) is used. The space velocity of the model gas in the reactor is set to 60,000 h$^{-1}$.

| <Composition of model gas> | |
|---|---|
| Propylene | 1665 ppmc |
| NOx | 0.1% |
| CO | 0.6% |
| $N_2$ | balance |
| $H_2$ | 0.2% |
| $O_2$ | 0.6% |
| $CO_2$ | 13.9% |

Figure 3:
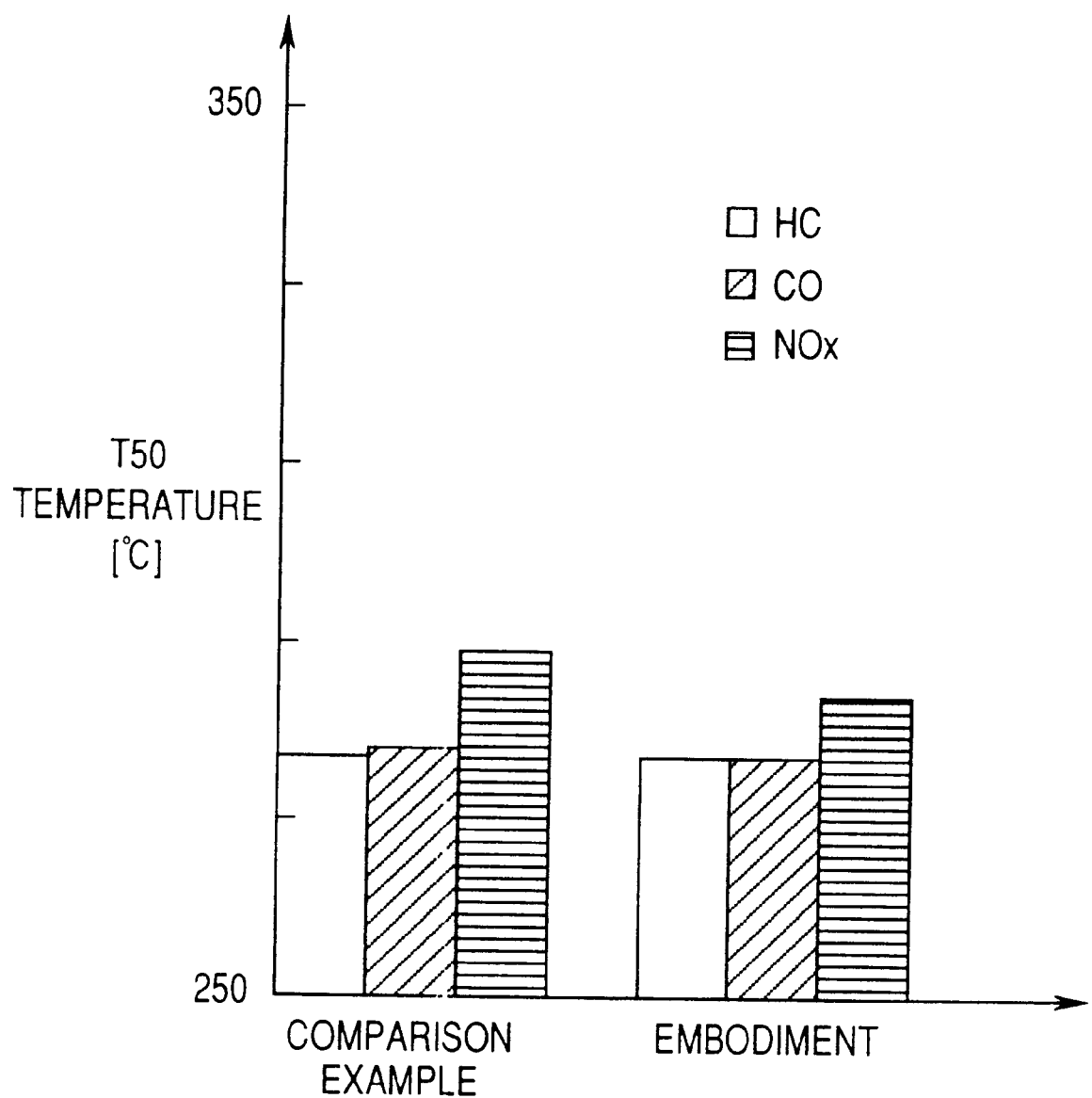
FIG. 3 is a diagram showing T50 temperature of exhaust gas purifying catalysts according to the embodiment with respect to HC, CO, and NOx in contrast with comparison examples.

FIG. 3 shows measured values of T50 temperature with respect to HC, CO, and NOx after heat-treating the exhaust gas purifying catalyst (this embodiment) according to this invention and the conventional exhaust gas purifying catalyst for comparison example. Both catalysts were heat-treated by exposing them to 1000° C. air for 24 hours in order to confirm high-temperature heat resistance. The T50 temperature referred to here is the exhaust gas inlet temperature [° C.] when HC, CO or NOx purifying ratio becomes 50%. That is, the T50 temperature is an index for evaluating the exhaust gas purifying performance at low temperature or low-temperature activity of the exhaust gas purifying catalyst, indicating that the lower the T50 temperature, the higher is the exhaust gas purifying performance at low temperature or low-temperature activity.

Figure 4:
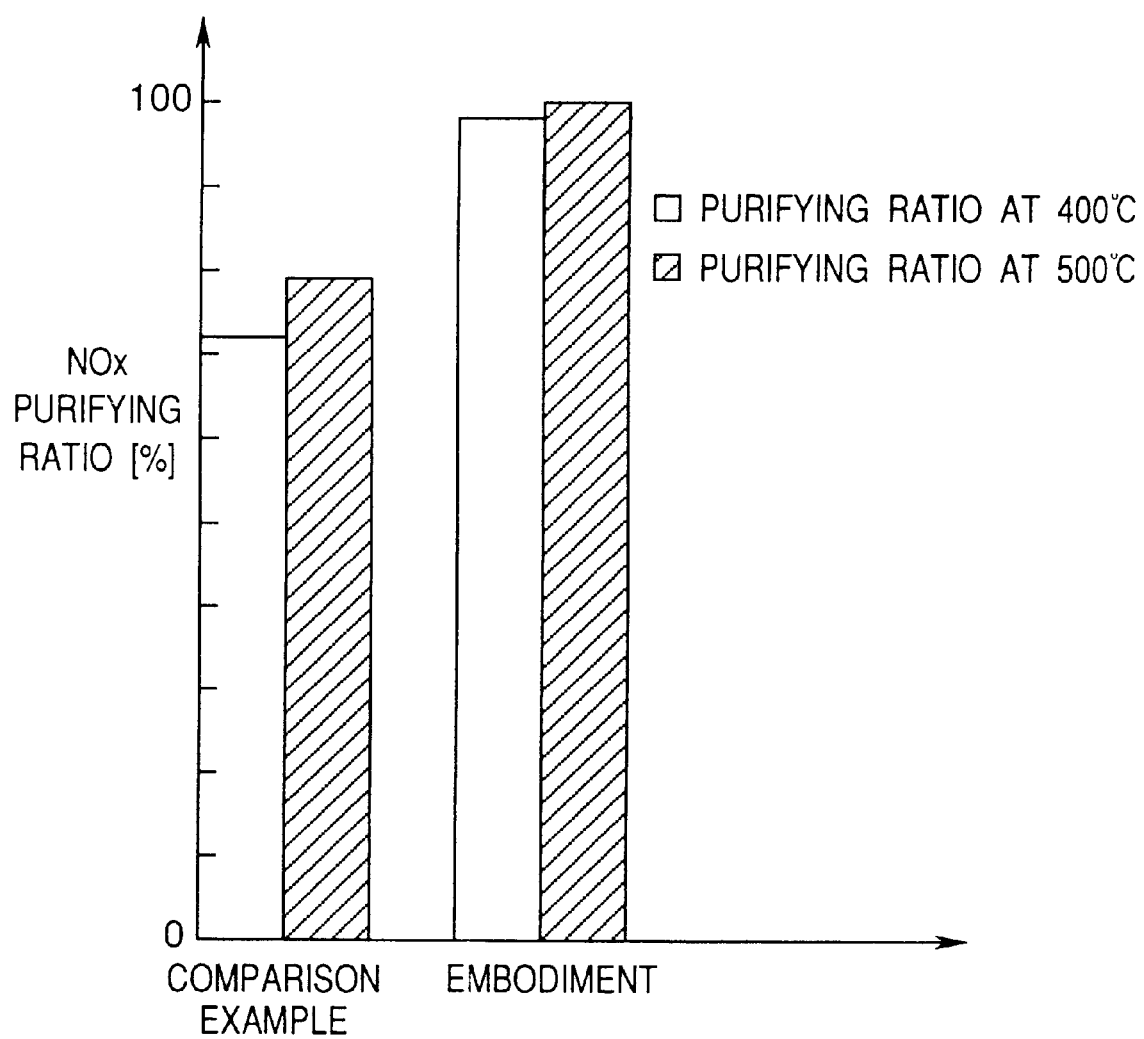
FIG. 4 is a diagram showing the NOx purifying ratio at 400° C. and 500° C. of the exhaust gas purifying catalyst according to embodiment 1 in contrast with comparison examples.

FIG. 4 shows the measured values of NOx purifying ratio at 400° C. and 500° C. after heat-treating the exhaust gas purifying catalyst (this embodiment) according to this invention and the conventional exhaust gas purifying catalyst for comparison example. Both catalysts were heat-treated by exposing them to 1000° C. air for 24 hours in order to confirm high-temperature heat resistance.

As shown in FIG. 3, the T50 temperature with respect to CO and NOx apparently decreases in the exhaust gas purifying catalyst according to this invention as compared to the conventional exhaust gas purifying catalyst for comparison, and the T50 temperature with respect to HC is nearly equivalent. Consequently, the exhaust gas purifying catalyst according to this invention provides better exhaust gas purifying performance at low temperature or low-temperature activity than the conventional exhaust gas purifying catalyst.

As shown in FIG. 4, the T50 temperature with respect to NOx purifying ratios at 400° C. and 500° C. apparently increase in the exhaust gas purifying catalyst according to this invention as compared to the conventional exhaust gas purifying catalyst for comparison. Consequently, the exhaust gas purifying catalyst according to this invention provides both excellent exhaust gas purifying performance at low temperature and NOx purifying performance at high temperature simultaneously. In this exhaust gas purifying catalyst, the content of impurities is preferably less than 1 wt %. In this event, the exhaust gas purifying performance of the exhaust gas purifying catalyst is still more improved.

By the way, in the exhaust gas purifying catalyst according to this invention (hereinafter called "the present exhaust gas purifying catalyst"), (Ce, Pr) compound oxide is used for a promoter. However, even when the said praseodymium is replaced with other rare earth elements (X) other than praseodymium in the said compound oxide, there is a good possibility to achieve the similar action and effects. Therefore, various exhaust gas purifying catalysts were produced using compound oxides of cerium and such rare earth elements (hereinafter called "(Ce, X) compound oxide") as promoters, and exhaust gas purifying performance of the said exhaust gas purifying catalysts was investigated.

Figure 5:
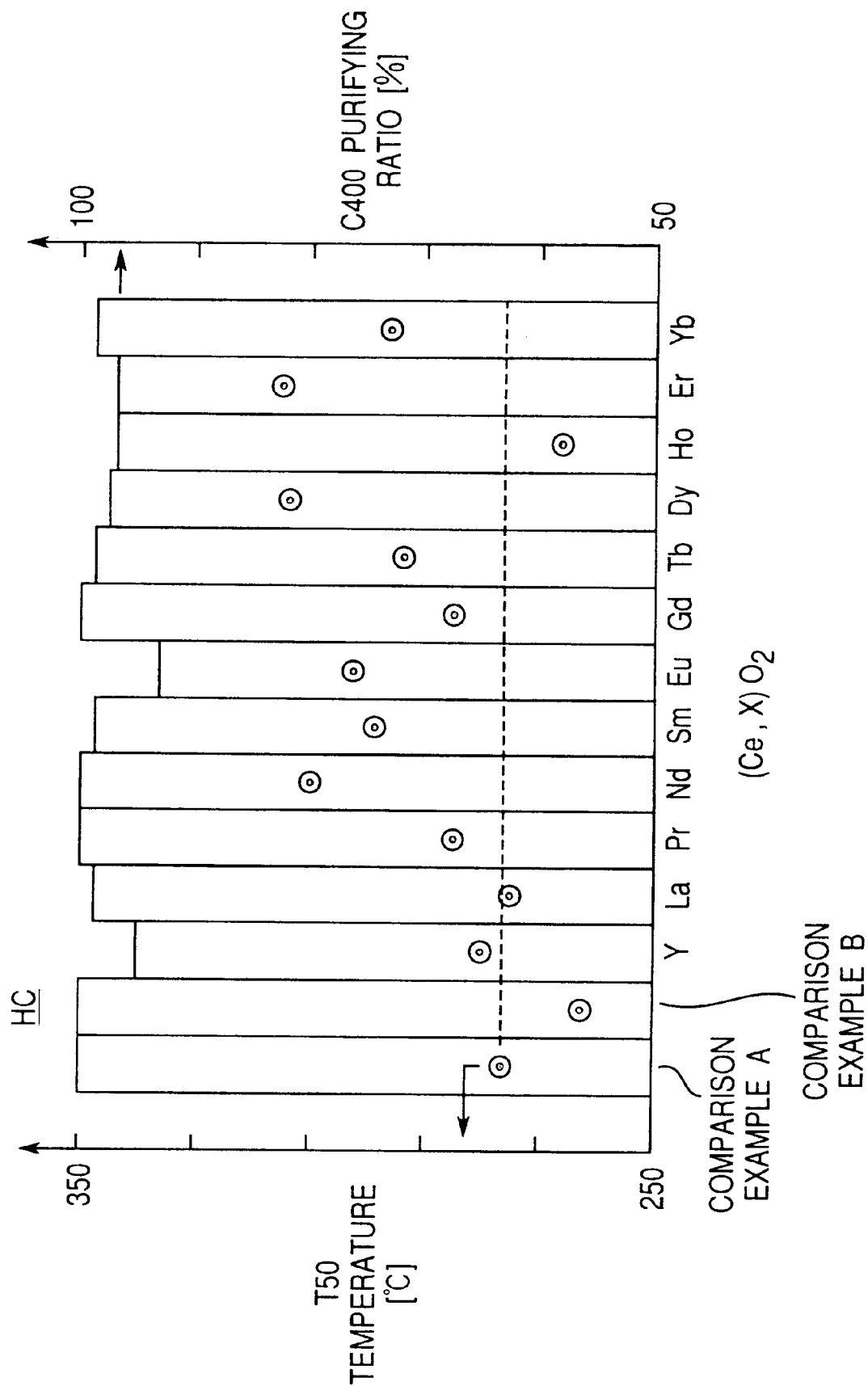
FIG. 5 is a graph showing T50 temperature and C400 purifying ratio of various exhaust gas purifying catalysts containing compound oxides of cerium and rare earth elements with respect to HC.
Figure 6:
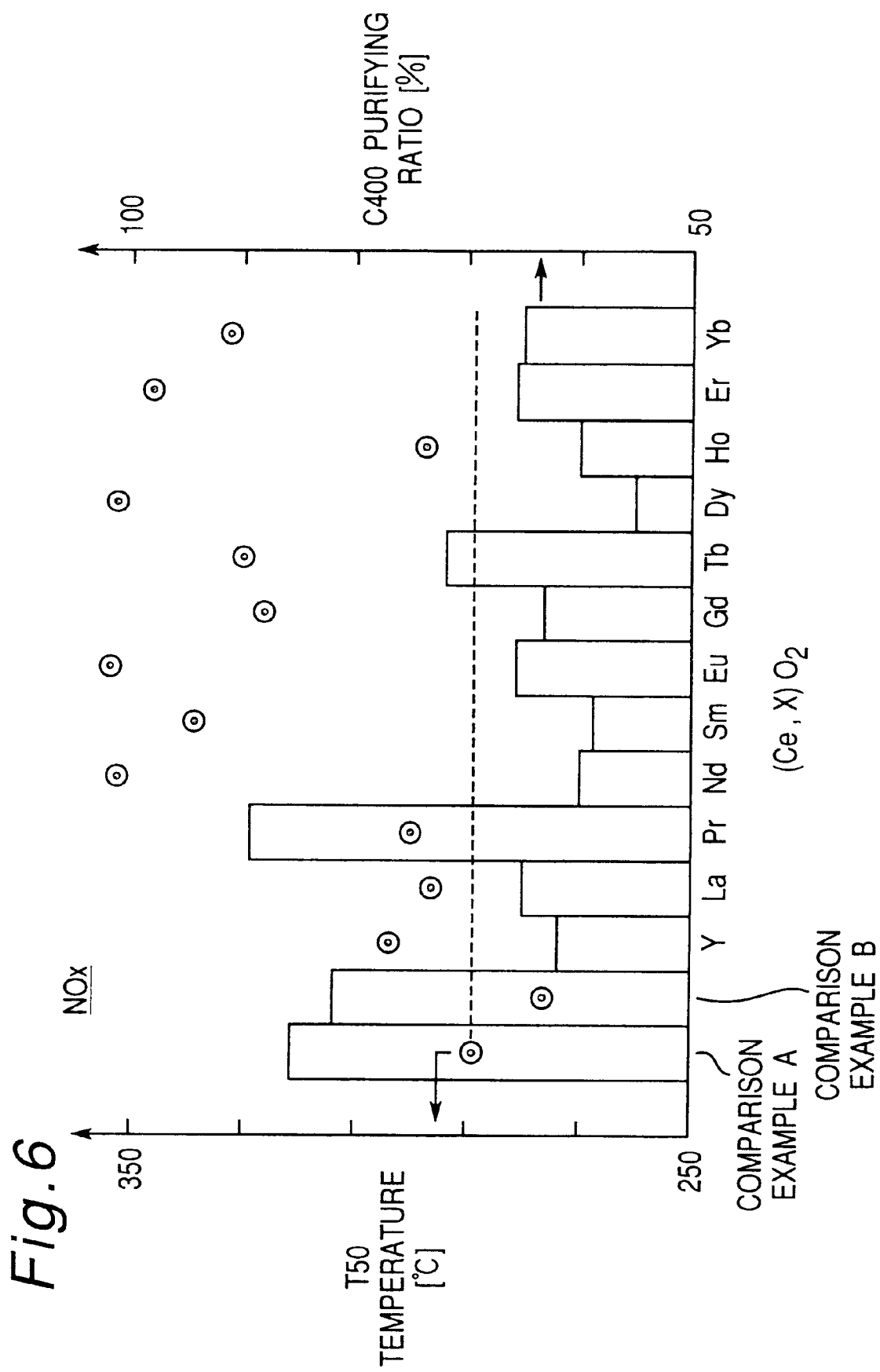
FIG. 6 is a graph showing T50 temperature and C400 purifying ratio of various exhaust gas purifying catalysts containing compound oxides of cerium and rare earth elements with respect to NOx.
Figure 7:
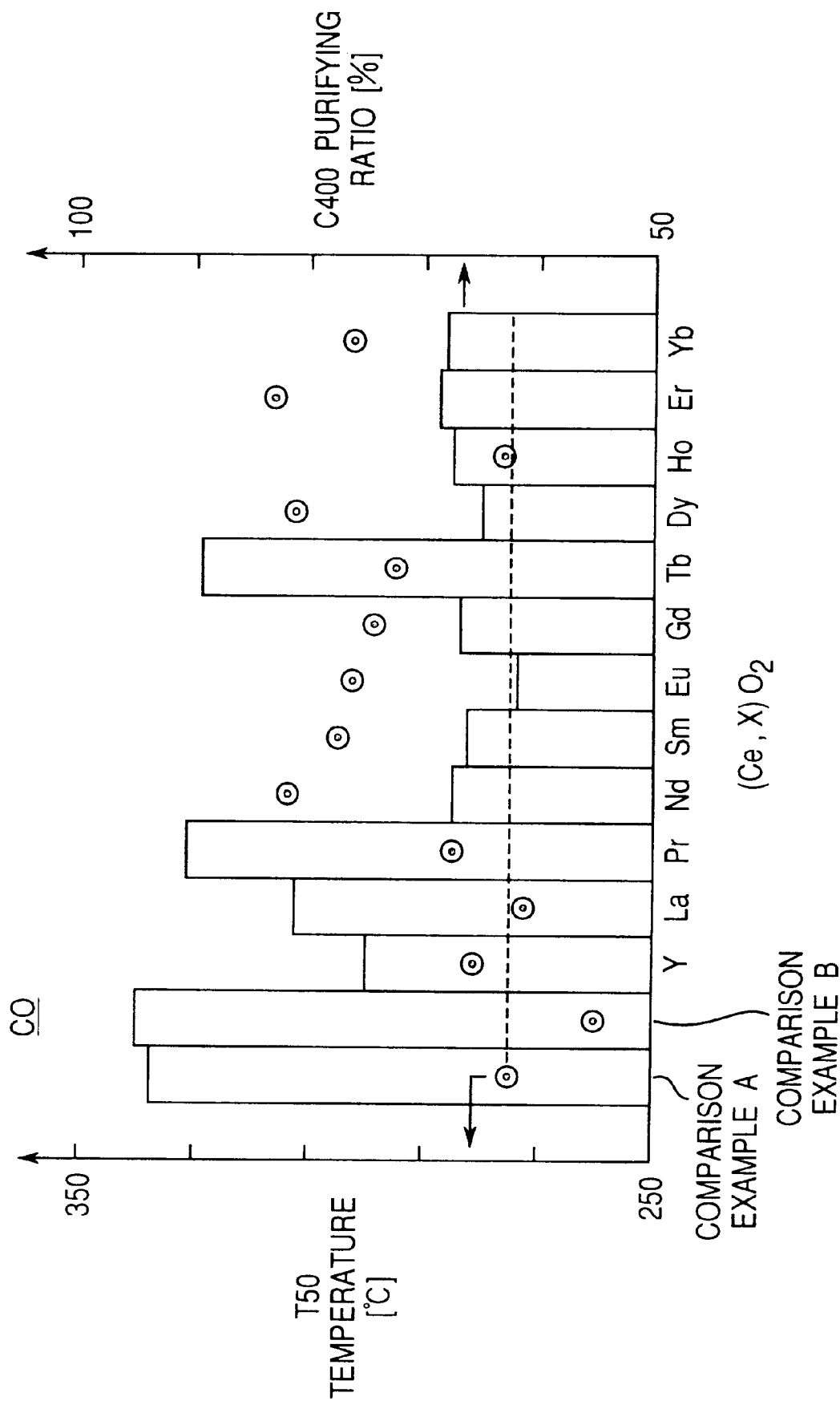
FIG. 7 is a graph showing T50 temperature and C400 purifying ratio of various exhaust gas purifying catalysts containing compound oxides of cerium and rare earth elements with respect to CO.

FIGS. 5–7 show measured values of T50 temperature and C400 temperature of the exhaust gas purifying catalysts containing (Ce, X) compound oxide with respect to HC, NOx and CO, when yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er) or ytterbium (Yb) is used for rare earth element (X). FIGS. 5–7 also show the measured values of T50 temperature and C400 purifying ratio of two types of conventional exhaust gas purifying catalysts (comparison A and B) which do not contain such compound oxide with respect to HC, NOx and CO for comparison.

The properties of the exhaust gas purifying catalysts containing the (Ce, X) compound oxide and comparisons A and B are shown as follows. That is, the present exhaust gas purifying catalyst contains (Ce, Pr) compound oxide, cerium oxide, palladium, and alumina as described above, but the exhaust gas purifying catalyst containing (Ce, X) compound oxide has the (Ce, Pr) compound oxide in the present exhaust gas purifying catalyst replaced with the same amount of (Ce, X) compound oxide. Consequently, the present exhaust gas purifying catalyst and the exhaust gas purifying catalyst containing (Ce, X) compound oxide contain the same amount of cerium oxide, palladium, and alumina (though the types of rare earth element differ).

And comparisons A and B have X of exhaust gas purifying catalyst containing (Ce, X) compound oxide replaced with cerium, that is, (Ce, Pr) compound oxide in the present exhaust gas purifying catalyst replaced with cerium oxide ($CeO_2$) in the amount corresponding to the compound oxide. However, the surface area of cerium oxide to be replaced with (Ce, Pr) compound oxide is 100 m$^2$/g for comparison A and 70 m$^2$/g for comparison B.

In this event, the C400 purifying ratio is the purifying ratio [%] of HC, CO or NOx when inlet temperature of exhaust gas is 400° C. By the way, the purifying ratio when the inlet temperature of exhaust gas is 500° C. is called a C500 purifying ratio. That is, the C400 purifying ratio is an index for evaluating the exhaust gas purifying performance at high temperature of about 400° C., while the C500 purifying ratio is an index for evaluating the exhaust gas purifying performance at high temperature of about 500° C.

In each of these exhaust gas purifying catalysts, the palladium supporting rate is set to 1.3 g/L-cat and γ-alumina is used for the substrate. And in the exhaust gas purifying catalyst containing these compound oxides, the mol ratio of cerium to rare earth element is set to 7/3. That is, if the element symbol of each rare earth element is expressed with X, each of the compound oxides is expressed by ($Ce_{0.7}$, $X_{0.3}$)$O_2$. Each exhaust gas purifying catalysts was heat-treated by exposing the relevant exhaust gas purifying catalysts in 1000° C. air for 24 hours. For the exhaust gas to be treated, model gas equivalent to the exhaust gas which corresponds to the mixture air whose air-fuel ratio A/F is 14.7±0.9.

As shown in FIGS. 5–7, it is assumed that those using praseodymium for rare earth element generally provides the most excellent exhaust gas purifying performance of various compound oxides. However, because even when terbium is used for a rare earth element, the comprehensive exhaust gas purifying performance, in particular, NOx and CO purifying performance at high temperature is excellent, it is assumed that (Ce, Tb) compound oxide is able to be used for a promoter for the exhaust gas purifying catalyst.

Now, description is made as follows on the results of various experiments carried out to find preferable ratio of praseodymium to cerium in (Ce, Pr) compound oxide used together with a promoter of exhaust gas purifying catalyst.

In the following description, the ratio of praseodymium to cerium in (Ce, Pr) compound oxides (hereinafter, called the "Pr ratio") is expressed with a mol ratio. That is, expressing this Pr ratio with x enables the (Ce, Pr) compound oxide to be expressed by ($Ce_{1-x}$, $Pr_x$)$O_2$.

Figure 8:
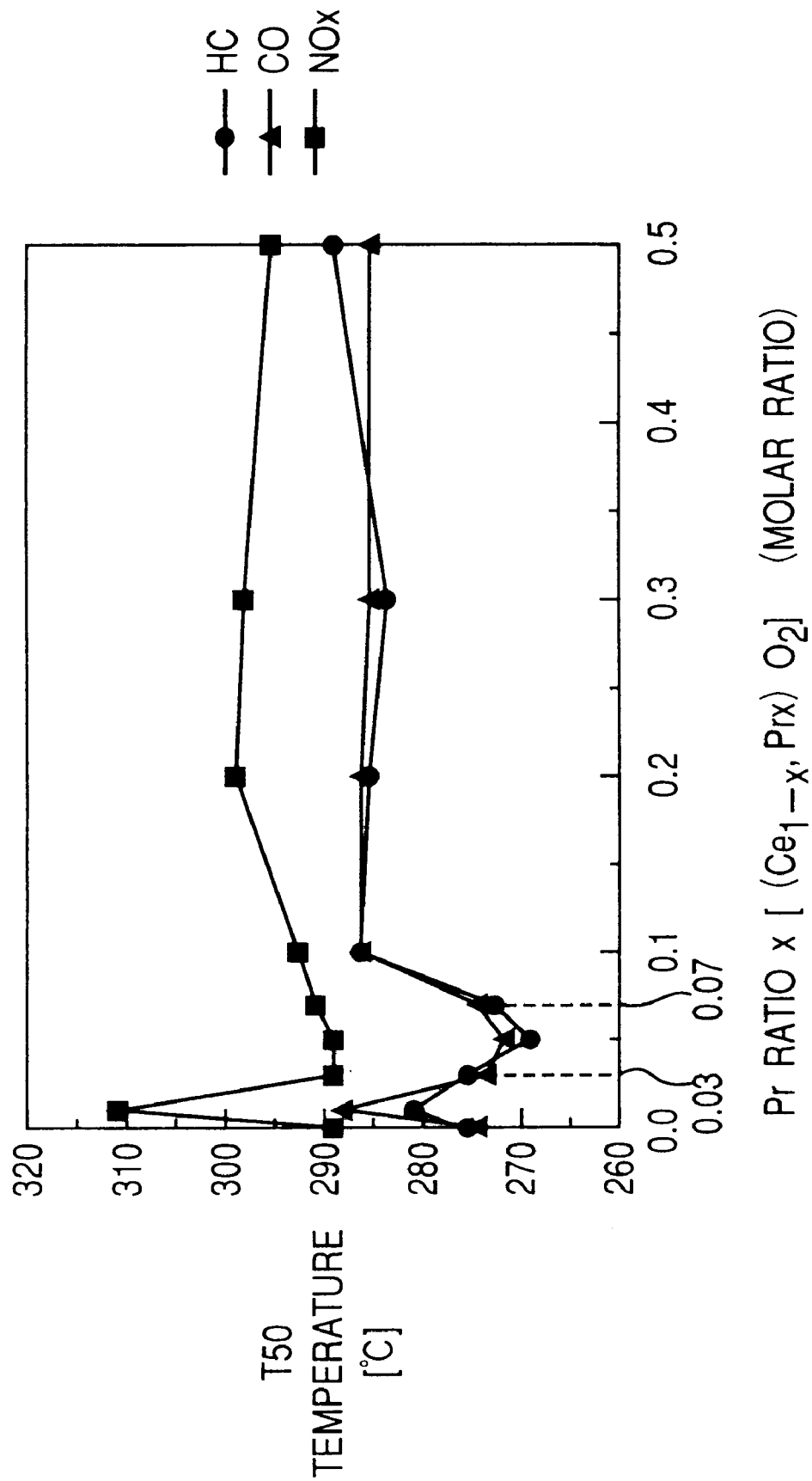
FIG. 8 is a graph showing measured T50 temperatures with respect to HC, CO and NOx in several exhaust gas purifying catalysts containing (Ce, Pr) compound oxides with varying Pr ratio x.
Figure 9:
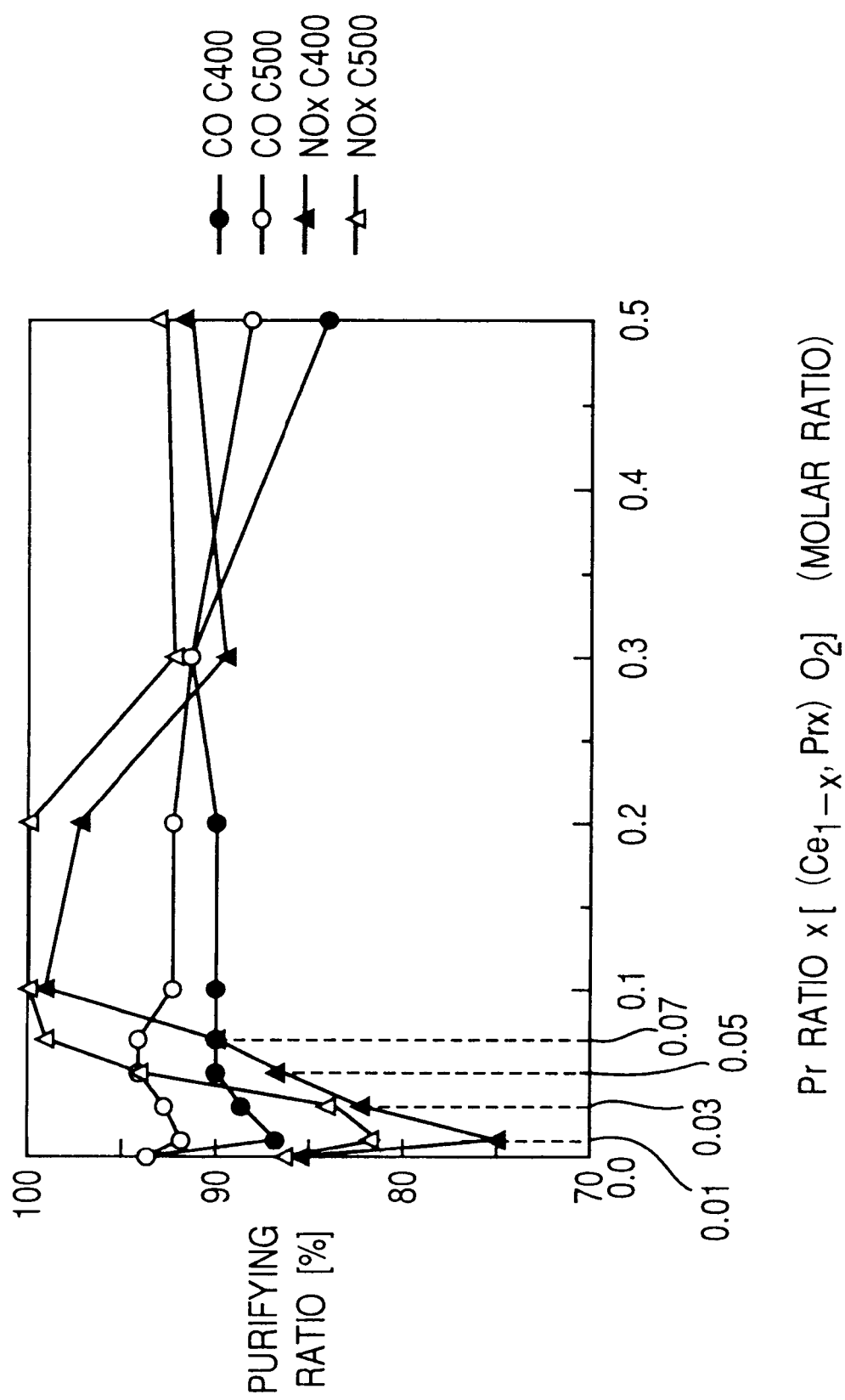
FIG. 9 is a graph showing measured C400 purifying ratio and C500 purifying ratio with respect to CO and NOx in several exhaust gas purifying catalysts containing (Ce, Pr) compound oxides with varying Pr ratio x.

FIG. 8 shows a measured value of T50 temperature for HC, CO, and NOx in several exhaust gas purifying catalysts (after durability test carried at 1000° C. for 24 hours) containing (Ce, Pr) compound oxides with varying Pr ratio x. FIG. 9 shows measured values of C400 purifying ratio and C500 purifying ratio with respect to CO and NOx in several exhaust gas purifying catalysts (after durability test carried at 1000° C.×24 hr) containing (Ce, Pr) compound oxides with varying Pr ratio x.

Figure 10:
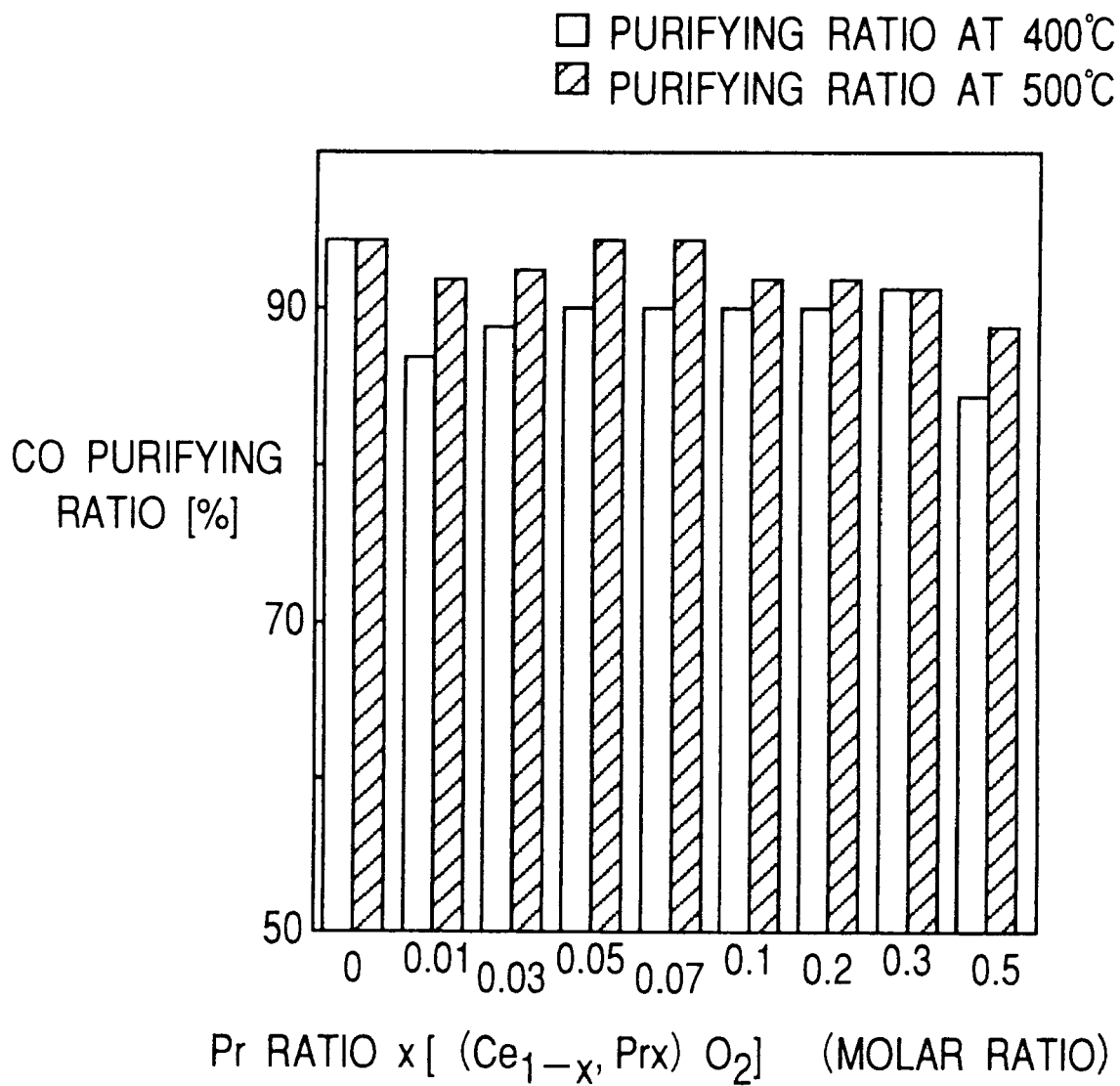
FIG. 10 is the other graph showing measured C400 purifying ratio and C500 purifying ratio with respect to CO and NOx in several exhaust gas purifying catalysts containing (Ce, Pr) compound oxides with varying Pr ratio x.
Figure 11:
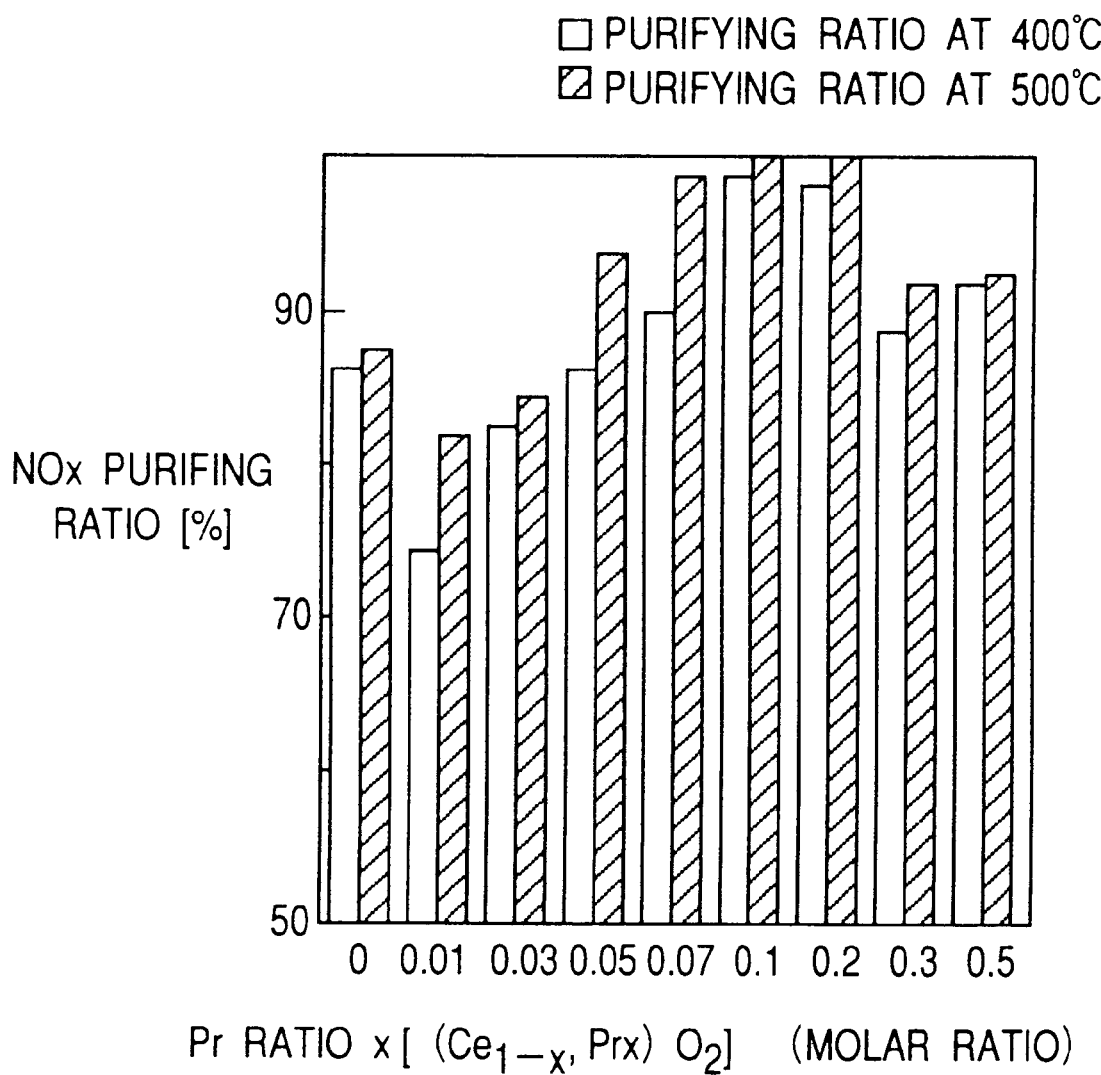
FIG. 11 is another graph showing measured C400 purifying ratio and C500 purifying ratio with respect to CO and NOx in several exhaust gas purifying catalysts containing (Ce, Pr) compound oxides with varying Pr ratio x.

In addition, FIG. 10 and FIG. 11 show bar graphs of C400 purifying ratio and C500 purifying ratio with respect to CO and NOx in several exhaust gas purifying catalysts containing (Ce, Pr) compound oxides with varying Pr ratio x of FIG. 9, respectively.

According to FIG. 8, when the Pr ratio x is between about 0.03 and 0.07, T50 temperatures of HC and CO are particularly low, thereby indicating that the HC and CO purifying performance at low temperature is extremely satisfactory.

According to FIG. 9, when the Pr ratio x is between about 0.05 and 0.5, NOx purifying ratio at high temperature is particularly high, indicating that the NOx purifying performance at high temperature is extremely high particularly when it is between 0.07 and 0.2. And it also indicates that when the Pr ratio x is between 0.05 and 0.07, the CO purifying ratio is high. In this way, according to the measured values shown in FIG. 8–FIG. 11, the suitable range of the Pr ratio x is roughly between 0.03 and 0.5, where the NOx purifying ratio at high temperature is particularly improved. However, the Pr ratio x is preferably between 0.03 and 0.2, where the NOx purifying ratio and the CO purifying ratio at high temperature are particularly improved. The Pr ratio x is more suitably between 0.05 and 0.2, where the NOx purifying ratio and the CO purifying ratio at high temperature are still more improved. However, the Pr ratio x is the best suitably between 0.05 and 0.07, where the NOx purifying ratio and the CO purifying ratio at high temperature as well as HC, CO and NOx purifying performance at low temperature are greatly improved.

Now, in the exhaust gas purifying catalyst according to this invention, as described before, cerium oxide and (Ce, Pr) compound oxide are used for promoters, and these are simply in the physically mixed condition, but the exhaust gas purifying performance of the exhaust gas purifying catalyst will be varied in accord with the mixture ratio of these. Now, results of various experiments carried out for finding a preferable mixture ratio of cerium oxide to (Ce, Pr) compound oxide in the exhaust gas purifying catalyst according to this invention will be described.

Figure 12:
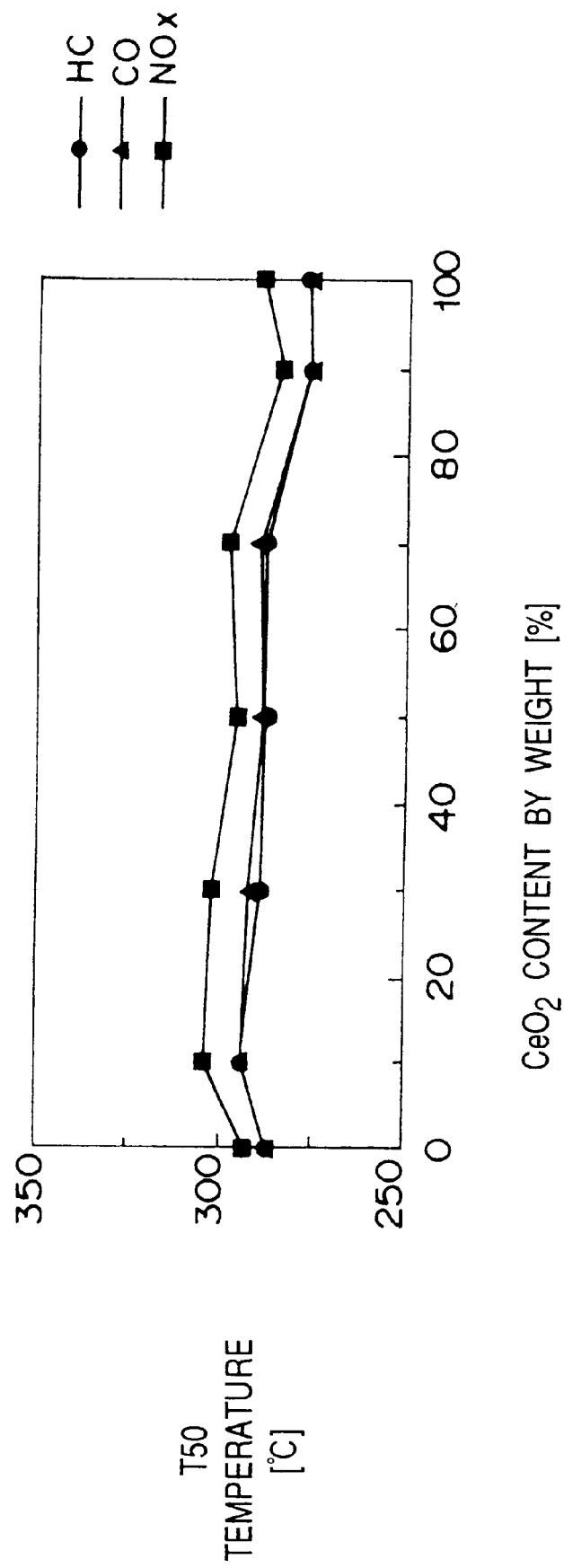
FIG. 12 is a graph showing measured T50 temperature with respect to HC, CO and NOx in several exhaust gas purifying catalysts containing a promoter with varying weight % of cerium oxide.
Figure 13:
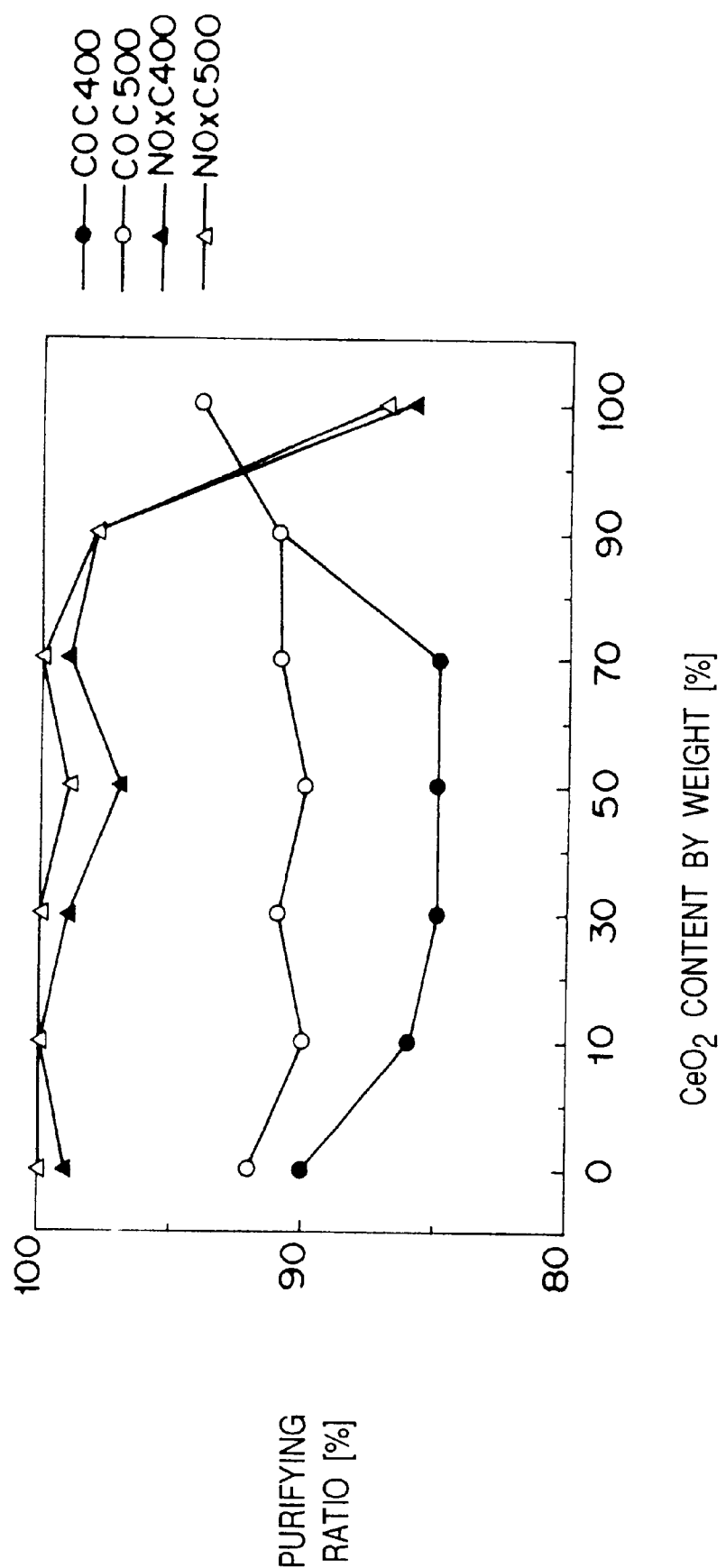
FIG. 13 is a graph showing measured C400 purifying ratio and C500 purifying ratio with respect to CO and NOx in several exhaust gas purifying catalysts containing a promoter with varying weight % of cerium oxide.

In FIG. 12 or FIG. 13, the mixture ratio of cerium oxide to (Ce, Pr) compound oxide is expressed in the percentage by weight of cerium oxide in the total promoter (hereinafter called "wt % of cerium oxide"). For example, if this wt % of cerium oxide is zero, the promoter consists of (Ce, Pr) compound oxide only, and if 50%, cerium oxide and (Ce, Pr) compound oxide are contained in the equal weight in the promoter, and if 100%, the promoter consists of cerium oxide only.

Figure 14:
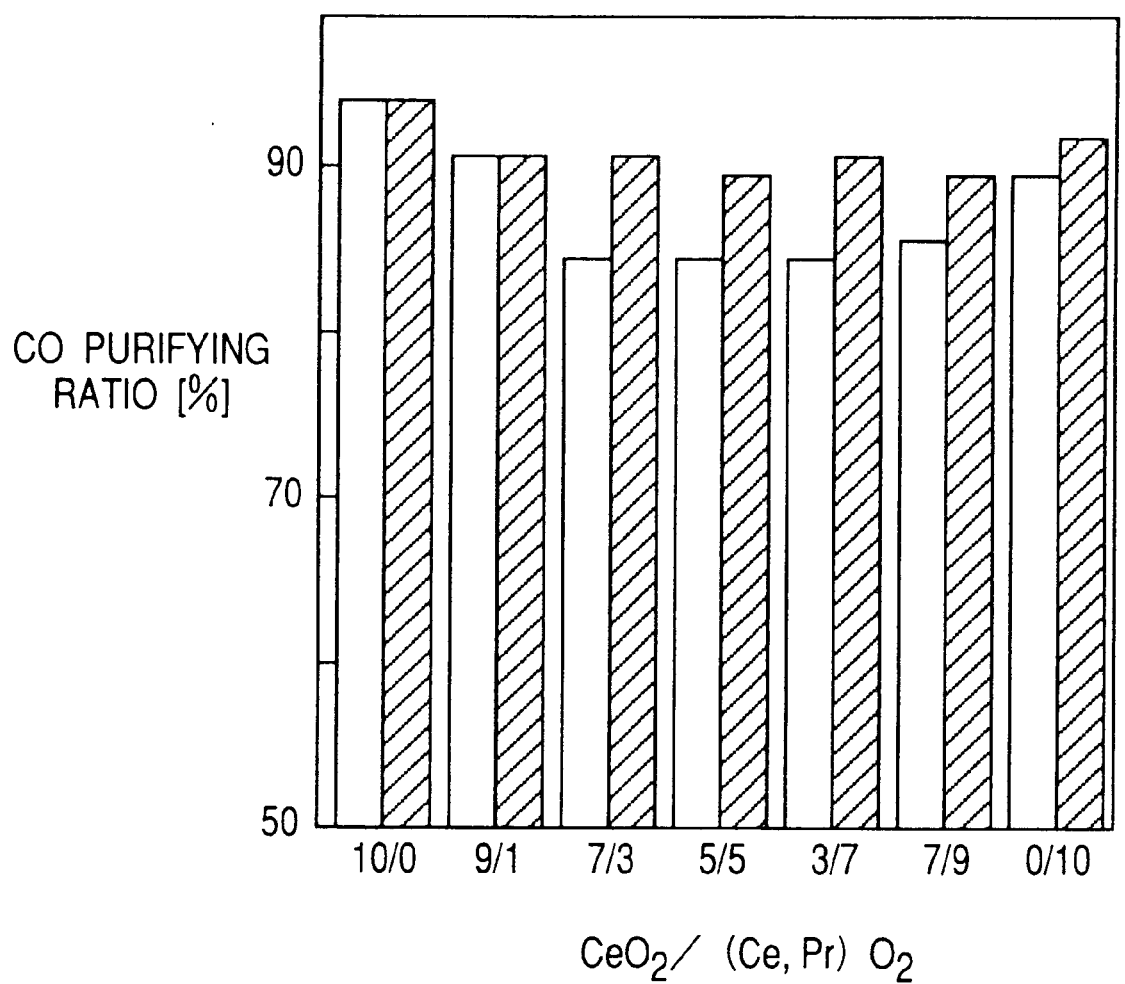
FIG. 14 is the other graph showing measured C400 purifying ratio and C500 purifying ratio with respect to CO in several exhaust gas purifying catalysts containing a promoter with varying weight ratio of $CeO_2/(Ce, Pr)O_2$.
Figure 15:
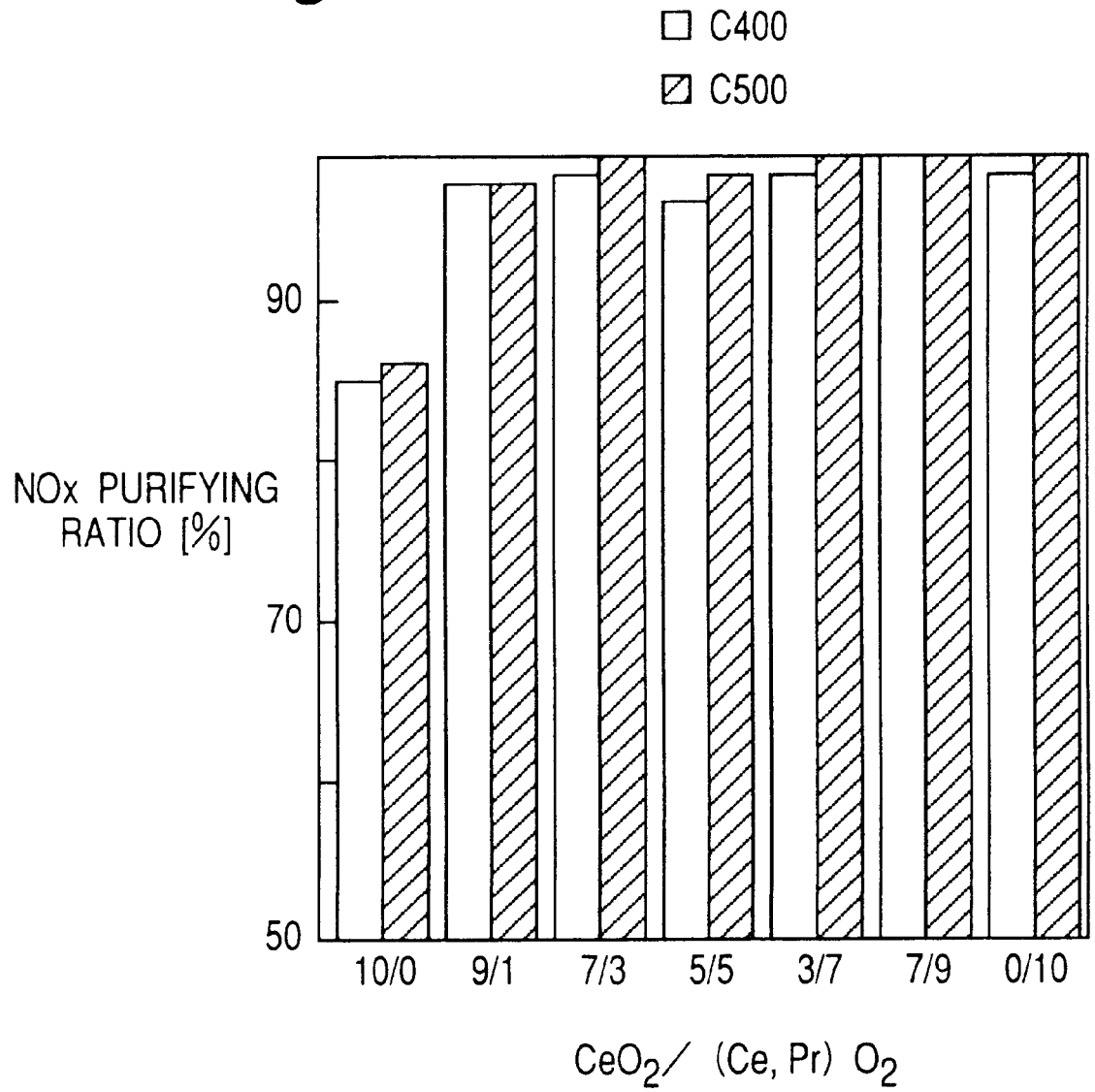
FIG. 15 is another graph showing measured C400 purifying ratio and C500 purifying ratio with respect to NOx in several exhaust gas purifying catalysts containing a promoter with varying weight ratio of $CeO_2/(Ce, Pr)O_2$.

In FIG. 14 and FIG. 15, the mixture ratio of cerium oxide to (Ce, Pr) compound oxide is expressed by the weight ratio of cerium oxide to (Ce, Pr) compound oxide ($CeO_2$/(Ce, Pr)$O_2$) in the promoter. For example, if this $CeO_2$/(Ce, Pr)$O_2$ is 0/10, the promoter consists of (Ce, Pr) compound oxide only, and if 5/5, cerium oxide and (Ce, Pr) compound oxide are contained in the equal weight in the promoter, and if 10/0, the promoter consists of cerium oxide only.

FIG. 12 shows measured values of T50 temperature with respect to HC, CO and NOx in several exhaust gas purifying catalysts containing promoters with varying wt % of cerium oxide. FIG. 13 shows measured values of C400 purifying ratio and C500 purifying ratio with respect to CO and NOx in several exhaust gas purifying catalysts containing promoters with varying wt % of cerium oxide. In addition, FIG. 14 and FIG. 15 show C400 purifying ratio and C500 purifying ratio with respect to CO and NOx expressed by bar graphs in several exhaust gas purifying catalysts containing promoters with varying $CeO_2$/(Ce, Pr)$O_2$ of FIG. 13.

According to the measured values shown in FIG. 12 to FIG. 15, in general, the higher the wt % of cerium oxide, the lower is T50 temperature of HC, CO, and NOx. When the wt % of cerium oxide exceeds 90%, the T50 temperature seems to rise again. When the wt % of cerium oxide is generally 90% or less, the C400 purifying ratio and C500 purifying ratio of NOx increase. When the wt % of cerium oxide is generally 70% or higher, the C400 purifying ratio and C500 purifying ratio of CO increase. Consequently, it is assumed that setting the wt % of cerium oxide to the range of about 70% to 90% could improve exhaust gas purifying performance at low temperature of the exhaust gas purifying catalyst as well as the NOx and CO purifying performance at high temperature.

Embodiment 2

Now, embodiment 2 of this invention is specifically described. In this embodiment 2, as with the embodiment 1, to the exhaust system 1, an exhaust gas purifying device 2 is intermediately placed, and to the inside of this exhaust gas purifying device 2, the exhaust gas purifying catalyst 3 is filled (see FIG. 2).

Figure 16:
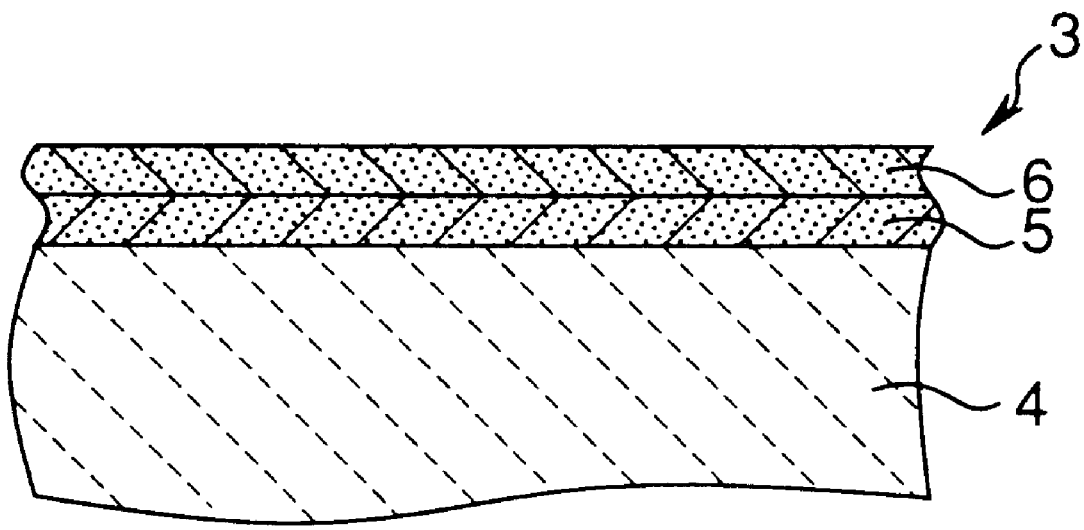
FIG. 16 is a longitudinal sectional view of an exhaust gas purifying device according to embodiment 2 of the present invention.

As shown in FIG. 16, in the exhaust gas purifying catalyst 3, a lower catalyst layer 6 (first catalyst layer) is formed (fixed) on the honeycomb-form carrier 4 made with Cordierite, material with excellent heat resistance. And on this lower catalyst layer 6, an upper catalyst layer 7 is further formed.

In this case, Cordierite is used for carrier material, but needless to say, the carrier material is not limited to Cordierite.

The lower catalyst layer 6 has basically a construction in which palladium, a catalytic component (active specie), is supported by substrate, porous γ-alumina. In addition, in this lower catalyst layer 6, cerium oxide (Ceria) and (Ce, Pr) compound oxide are contained as promoters. In this (Ce, Pr) compound oxide, cerium and praseodymium have chemical bonding relation and crystallized. By the way, cerium oxide and (Ce, Pr) compound oxide are merely physically mixed and no chemical bonding relation exists between the two.

In this lower catalyst layer 6, the ratio of cerium and praseodymium in (Ce, Pr) compound oxide can be optionally set, but in this embodiment, the mol ratio of cerium to praseodymium is set to 9/1. The atomic weight of cerium is 140.12, while the atomic weight of praseodymium is 140.91, which are nearly equivalent, and therefore, the weight ratio of the cerium to praseodymium is nearly equivalent to these mol ratios. The ratio of γ-alumina to cerium oxide to (Ce, Pr) compound oxide in this lower catalyst layer 6 is set to 20:19:1 by weight, respectively.

On the other hand, the upper catalyst layer 7 has a construction in which platinum (Pt) and rhodium (Rh), both catalyst components (active species), are supported on cerium oxide which is a substrate but functions as a promoter at the same time. In this event, in this upper catalyst layer 7, no (Ce, Pr) compound oxide is contained. This is because (Ce, Pr) compound oxide lowers the catalyst activity of platinum and rhodium. By the way, in the upper catalyst layer 7, γ-alumina may be contained as a substrate, but in such event, the alumina content in the upper catalyst layer 7 must be designed to be lower than the γ-alumina content in the lower catalyst layer 6.

In addition, in this exhaust gas purifying catalyst 3, the contents (support volumes) of platinum and palladium and rhodium, catalyst components, are set to 1 g/L-cat, and 14 g/L-cat, and 2–5.7 g/L-cat, respectively. In this exhaust gas purifying catalyst 3, the impurity content of the lower catalyst layer 6 and upper catalyst layer 7 is preferably less than 1 wt %, respectively.

Now, the manufacturing method of such exhaust gas purifying catalyst 3 is described as follows. That is, this exhaust gas purifying catalyst 3 is manufactured via the following steps.

(1) Heat treatment of γ-alumina

Expose pure γ-alumina powders in the 900° C. air for 50 hours to heat-treat the γ-alumina. By this treatment, heat stability of the γ-alumina is improved.

(2) Support of palladium

After physically mixing heat-treated γ-alumina and cerium oxide powders, add an aqueous solution of palladium compound (for example, dinitrodiamine-palladium), active species, to this mixture dropwise to impregnate, and then, dry the mixture. In this way, a palladium supporting powder in which palladium, a catalytic component (active species), is supported on γ-alumina and cerium oxide is obtained.

(3) Synthesis of (Ce, Pr) compound oxide

After mixing the aqueous nitrate solution of cerium and aqueous nitrate solution of praseodymiumn, add ammonia to this mixture to cause coprecipitation. Then, wash and dry this precipitate; then, fire at temperature of about 600° C. With this procedure, (Ce, Pr) compound oxide powder is obtained. The mol ratio of cerium to praseodymium in this (Ce, Pr) compound oxide is to 9:1. The solution should not be limited to the aqueous nitrate solution.

(4) Preparation of slurry for wash-coat for lower catalyst layer

Mix the palladium supporting powder, the (Ce, Pr) compound oxide powder, water, and binder to prepare slurry for wash-coat. In this slurry for wash-coat for the lower catalyst layer, the weight ratio of γ-alumina and cerium oxide and (Ce, Pr) compound oxide is set to 20:19:1.

(5) Wash-coat for forming the lower catalyst layer

Immerse the honeycomb-form carrier 4 comprising Cordierite in the slurry for lower catalyst layer wash-coat, and then, blow away an excess slurry. In this way, the carrier 4 is coated with lower catalyst layer wash-coat slurry. And dry the carrier 4 coated in this way at temperature of about 150° C., and then, fire at temperature of about 500° C. for about 2 hours. In this way, the lower catalyst layer 6 is formed (fixed) on the carrier 4.

(6) Support of platinum and palladium

To pure cerium oxide powders, add an aqueous solution containing nitrate of platinum and nitrate of rhodium as active species dropwise to impregnate, and then, dry the cerium oxide powder, and then, fire. In this way, a platinum/ rhodium supporting powder in which platinum and rhodium, catalytic compound (active species) are supported on cerium oxide is obtained. The compound of platinum or rhodium is not limited to nitrate.

(7) Preparation of slurry for wash-coat for upper catalyst layer

Mix the platinum/rhodium supporting powder, water, and binder to prepare slurry for upper catalyst layer wash-coat.

(8) Wash-coat for forming the upper catalyst layer

Coat the surface of the lower catalyst layer 6 formed on the carrier 4 with the upper catalyst layer wash-coat slurry. And dry the carrier 4 coated in this way at temperature of about 150° C., and then, fire at temperature of about 500° C. for about 2 hours. In this way, an exhaust gas purifying catalyst 3 is completed, in which the lower catalyst layer 6 is formed (fixed) on the carrier 4, and furthermore, on this lower catalyst layer 6, the upper catalyst layer 7 is formed (fixed).

Now, the measured results of purifying performance of the exhaust gas purifying catalyst according to this invention manufactured in this way are described, while comparing with those of exhaust gas purifying catalyst manufactured by the method not according to this invention.

The exhaust gas purifying catalysts used for these measurements are following three types (samples A–C).

(1) Sample A (Comparison example)

Sample A is a conventional exhaust gas purifying catalyst and in the lower catalyst layer, cerium oxide only is used for a promoter and no (Ce, Pr) compound oxide is used. Other points are same as those of the exhaust gas purifying catalyst according to this invention manufactured by the above-mentioned manufacturing method.

(2) Sample B (Embodiment)

Sample B is the exhaust gas purifying catalyst according to this invention manufactured by the above-mentioned manufacturing method, and in the lower catalyst layer, cerium oxide and (Ce, Pr) compound oxide (mol ratio of Ce to Pr is 9:1) are used as promoters, and the weight ratio of cerium oxide to (Ce, Pr) compound oxide is 19:1. In other words, the weight ratio of γ-alumina and cerium oxide and (Ce, Pr) compound oxide in the lower catalyst layer is 50:47.5:2.5. Needless to say, no (Ce, Pr) compound oxide is contained in the upper catalyst layer.

(3) Sample C (Comparison example)

Sample C is an exhaust gas purifying catalyst specially prepared for comparison (not the conventional exhaust gas purifying catalyst), and in the lower catalyst layer, cerium oxide and (Ce, Pr) compound oxide (mol ratio of Ce to Pr is 9:1) are used for promoters, and the weight ratio of cerium oxide to (Ce, Pr) compound oxide is 9:1. In other words, the weight ratio of γ-alumina and cerium oxide and (Ce, Pr) compound oxide in the lower catalyst layer is 50:45:5. In addition, 10 wt % of (Ce, Pr) compound oxide (mol ratio of Ce to Pr is 9:1) is also contained in the upper catalyst layer.

FIG. 16 shows the results of the rig evaluation test with respect to samples A–C, indicating T50 temperature with respect to NOx and HC for samples A–C when the exhaust gas is equivalent to the case of air-fuel ratio A/F=14.7±0.9. The T50 temperature referred to here is the exhaust gas inlet temperature [° C.] when the purifying ratio of air pollutants (for example, HC, CO or NOx) becomes 50%. That is, the T50 temperature is an index for evaluating the exhaust gas purifying performance at low temperature or low-temperature activity of the exhaust gas purifying catalyst, indicating that the lower the T50 temperature, the higher is the exhaust gas purifying performance at low temperature or low-temperature activity. Samples A–C were heat-treated by exposing them in 1000° C. atmosphere for 24 hours to confirm high-temperature heat resistance.

The air-fuel ratio setting conditions (rig test conditions) in this rig evaluation test or rig evaluation tests later discussed are generally shown as follows. That is, if the air-fuel ratio A/F is set to for example, 14.7±0.2, with the main stream gas (synthesis gas) of a specified composition equivalent to A/F=14.7 allowed to constantly flow, the charging gas of a specified composition is charged in the form of pulse at 1 Hz, and the air-fuel ratio A/F is forcibly oscillated at an amplitude of ±0.2. In this case, the composition of the main stream gas equivalent to A/F=14.7 is set as follows:

| | |
|---|---|
| $CO_2$ | 13.9% |
| CO | 0.6% |
| HC | 0.056% |
| $N_2$ | balance |
| $O_2$ | 0.6% |
| $H_2$ | 0.2% |
| NO | 0.1% |

For the charging gas to generate oscillation with A/F=±0.2 amplitude, CO and $H_2$ are used when the air-fuel ratio is deflected to the rich side (A/F=14.5), and $O_2$ is used when it is deflected to the lean side (A/F=14.9). When the air-fuel ratio A/F is set to A/F=14.7±0.9, the volume of charging gas is changed so that the ±0.9 amplitude is achieved. If the air-fuel ratio A/F is set to for example, 14.8±0.2, with the main stream gas (synthesis gas) of a specified composition equivalent to A/F=14.8 allowed to constantly flow, the charging gas of a specified composition is charged in the form of pulse at 1 Hz, and the air-fuel ratio A/F is forcibly oscillated at an amplitude of ±0.2. In this case, the composition of the main stream gas equivalent to A/F=14.8 is set as follows:

| | |
|---|---|
| $CO_2$ | 13.9% |
| CO: | 0.5% |
| HC: | 0.056% |
| N2: | balance |
| $O_2$ | 0.8% |
| $H_2$ | 0.16% |
| NO | 0.1% |

And the charging gas for generating oscillation with A/F=±0.2 amplitude is same as is the case when the air-fuel ratio A/F is set to 14.7±0.2. When the air-fuel ratio A/F is set to A/F=14.8±0.9, the volume of charging gas is changed so that the ±0.9 amplitude is achieved.

Figure 17:
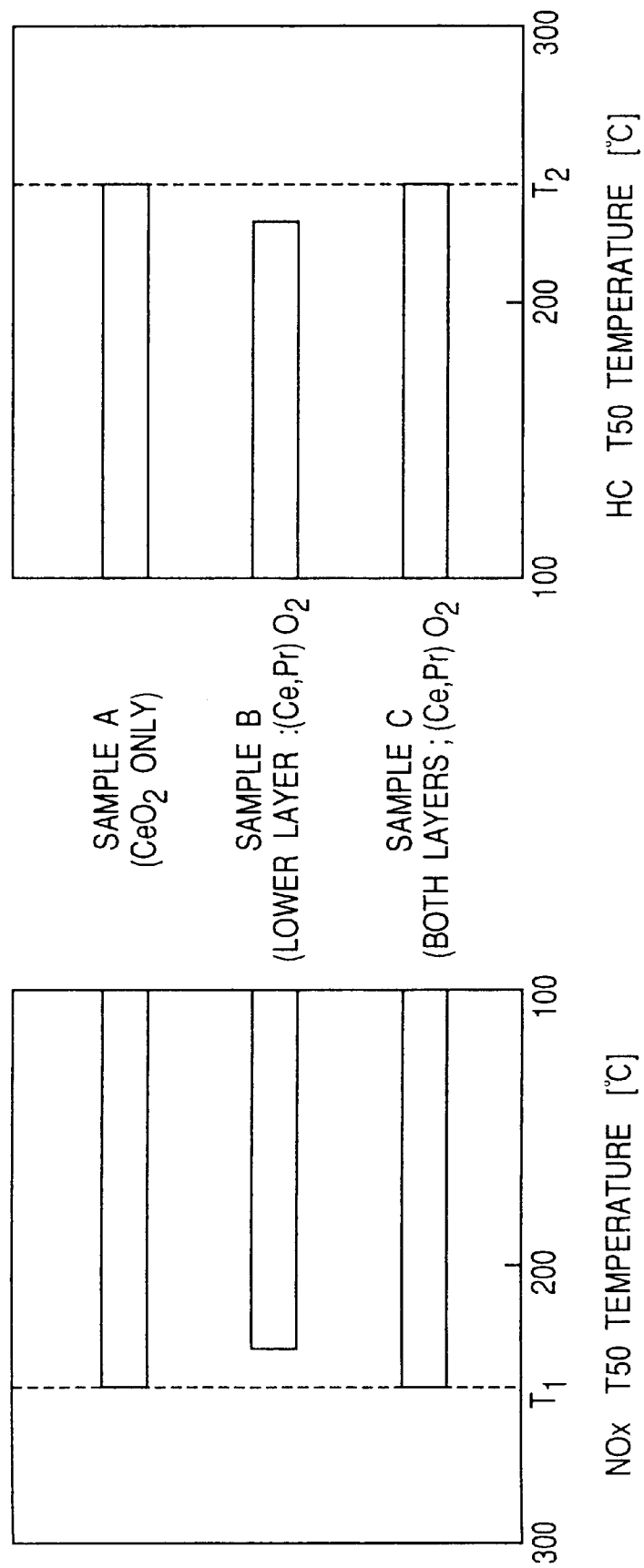
FIG. 17 is a diagram showing T50 temperature of exhaust gas purifying catalysts (sample B) according to the embodiment 2 with respect to NOx and HC in contrast with comparison examples (sample A, C)

As shown in FIG. 17, the T50 temperature with respect to NOx and HC apparently decreases in sample B, the exhaust gas purifying catalyst according to this invention, as compared to sample A, the conventional exhaust gas purifying catalyst or sample C, the exhaust gas purifying catalyst not according to this invention prepared for comparison. Consequently, the exhaust gas purifying catalyst according to this invention provides excellent exhaust gas purifying performance at low temperature or low-temperature activity after heat-treated at high temperature.

Figure 18:
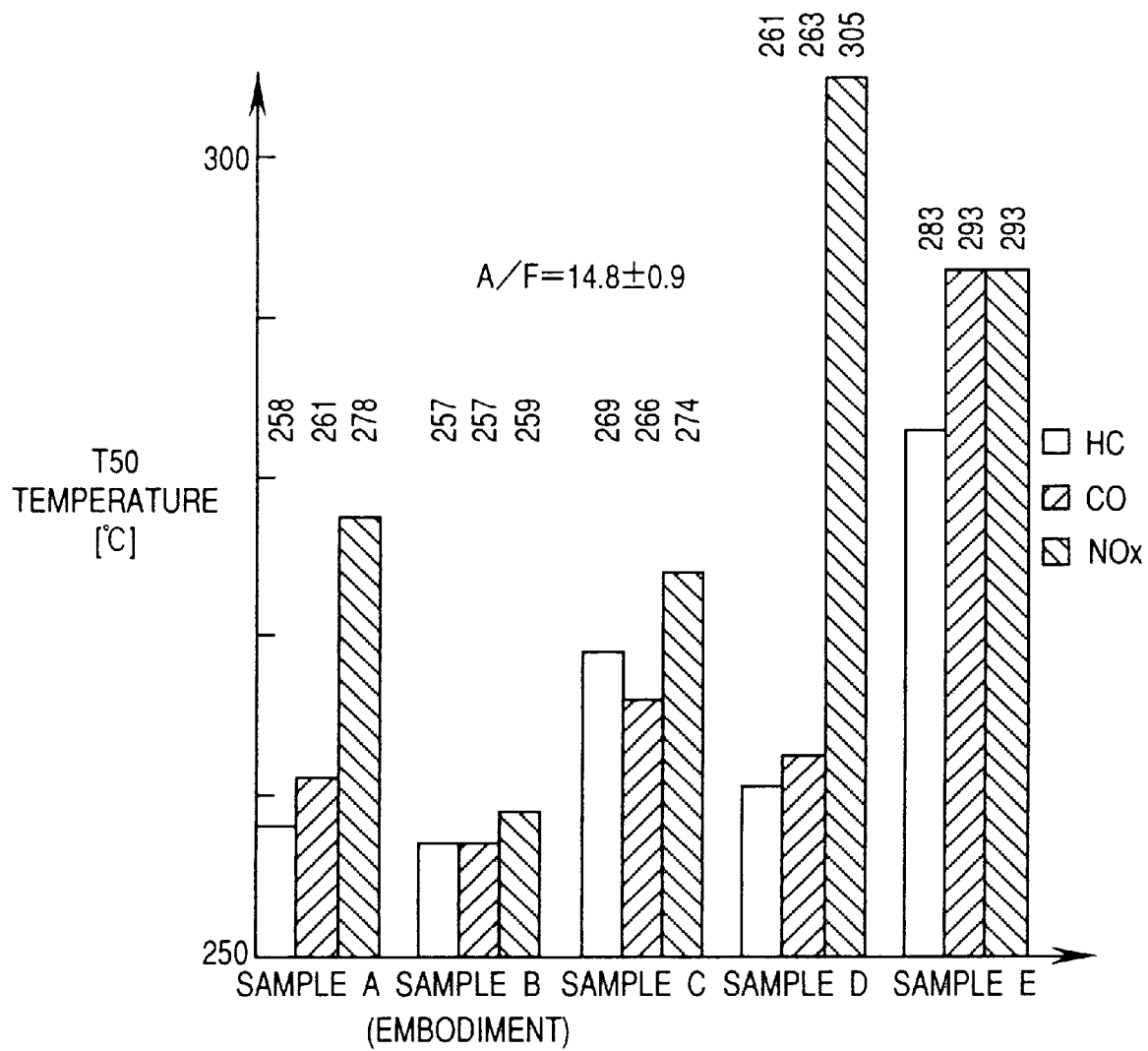
FIG. 18 is a diagram showing T50 temperature of exhaust gas purifying catalysts (sample B) according to the embodiment 2 with respect to HC, CO, and NOx in contrast with comparison examples (sample A, C, D, E)

FIG. 18 shows the results of another rig evaluation test carried out on the above samples A through C and the following two types of samples D, E, indicating T50 temperature with respect to HC, CO and NOx for samples A–E when the exhaust gas is equivalent to the case when the air-fuel ratio A/F=14.8±0.9. Each of samples A–E was heat-treated by exposing in 1000° C. atmosphere for 24 hours for confirming high-temperature heat resistance.

(1) Sample D (Comparison example)

In the upper catalyst layer, platinum and cerium oxide are, contained (no rhodium is contained), and in the lower catalyst layer, γ-alumina, cerium oxide, and (Ce, Pr) compound oxide are contained. The weight ratio of γ-alumina, cerium oxide, and (Ce, Pr) compound oxide in the lower catalyst layer is 20:19:1. Consequently, the composition of the lower catalyst layer of sample D is same as that in the case of sample B.

(2) Sample E (Comparison example)

In the upper catalyst layer, platinum, rhodium, and alumina are contained (no cerium oxide is contained) are contained, and in the lower catalyst layer, γ-alumina, cerium oxide, palladium, and (Ce, Pr) compound oxide are contained. The weight ratio of γ-alumina to cerium oxide to (Ce, Pr) compound oxide is 20:19:1. Consequently, the composition of the lower catalyst layer of sample E is the same as that of sample B and sample D.

As shown in FIG. 18, the T50 temperature with respect to HC, CO, and NOx apparently decreases in sample B, the exhaust gas purifying catalyst according to this invention, as compared to sample A or sample C, exhaust gas purifying catalysts not according to this invention. Consequently, the exhaust gas purifying catalyst according to this invention provides excellent exhaust gas purifying performance at low temperature or low-temperature activity after heat-treated at high temperature. In sample D in which no rhodium is contained in the upper catalyst layer, T50 temperature with respect to HC and CO is low, but T50 temperature with respect to NOx is extremely high, suggesting that rhodium is essential for NOx purification. Sample E in which no cerium oxide is contained in the upper catalyst layer, that is, cerium oxide in the upper catalyst layer replaced with alumina exhibits poor low-temperature activity with respect to NOx.

Figure 19:
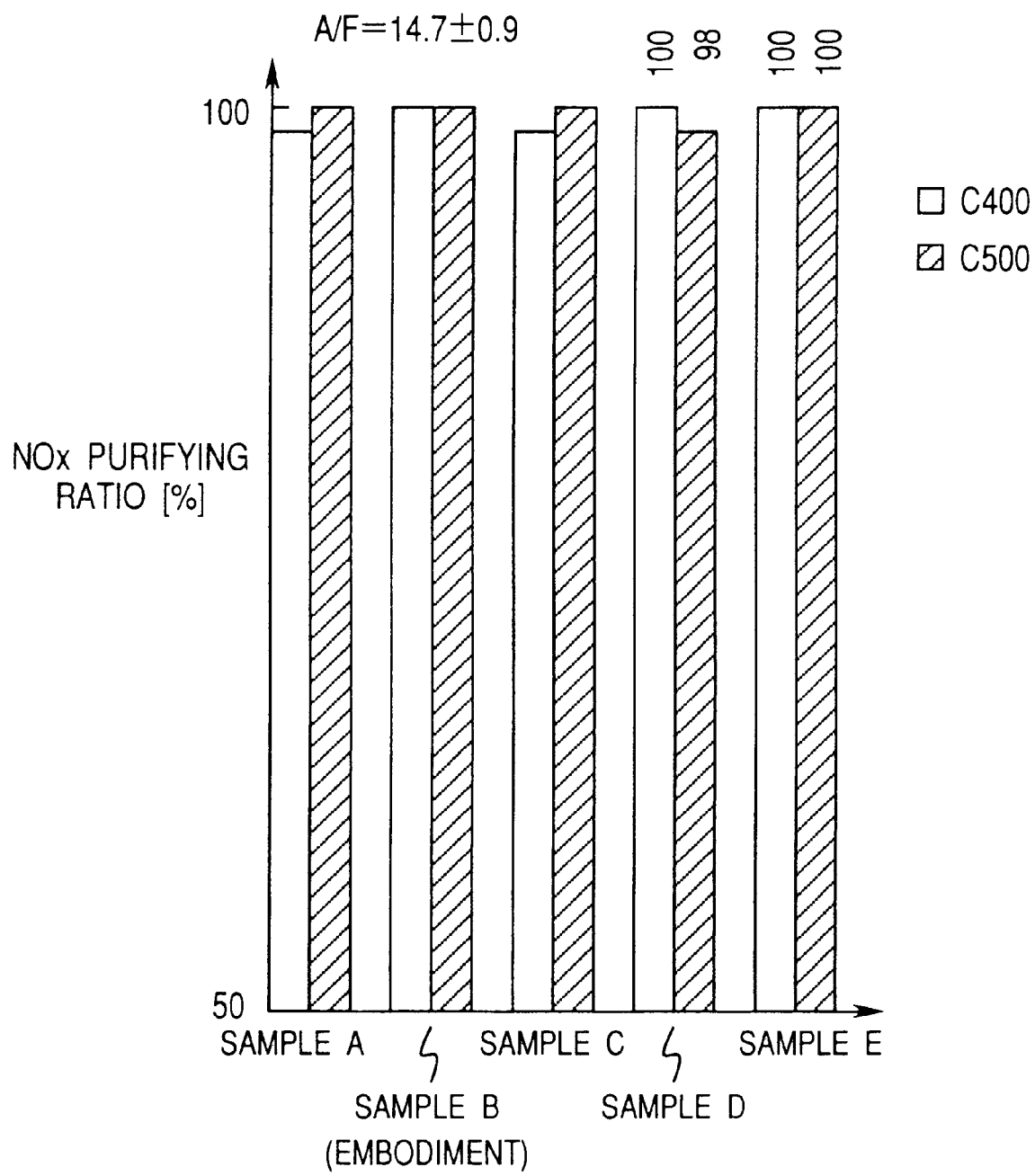
FIG. 19 is a diagram showing C400 purifying ratio and C500 purifying ratio of exhaust gas purifying catalysts (sample B) according to the embodiment 2 with respect to NOx in contrast with comparison examples (sample A, C, D, E)

FIG. 19 shows the results of still another rig evaluation test carried out on samples A–E, indicating C400 purifying ratio and C500 purifying ratio with respect to NOx for samples A–E when the exhaust gas is equivalent to the case when the air-fuel ratio A/F=14.7±0.9. In this event, the C400 purifying ratio is the purifying ratio [%] of air pollutants (for example, HC, CO or NOx) when inlet temperature of exhaust gas is 400° C., and the C500 purifying ratio is the purifying ratio when inlet temperature is 500° C. That is, the C400 purifying ratio is an index for evaluating the exhaust gas purifying performance at high temperature of about 400° C., while the C500 purifying ratio is an index for evaluating the exhaust gas purifying performance at high temperature of about 500° C. Each sample A–E was heat-treated by exposing it to 1000° C. atmosphere for 24 hours for confirming the high-temperature heat resistance.

As shown in FIG. 19, the C400 purifying ratio with respect to NOx apparently increases in sample B, the exhaust gas purifying catalyst according to this invention, as compared to sample A or sample C, exhaust gas purifying catalysts not according to this invention, and the C500 purifying ratio is nearly equivalent. In sample B, as compared to samples D–E, the C400 purifying ratio is nearly equivalent, and C500 purifying ratio is satisfactory (sample D) or equivalent (sample E). Consequently, the exhaust gas purifying catalyst according to this invention provides excellent NOx purifying performance.

Figure 20:
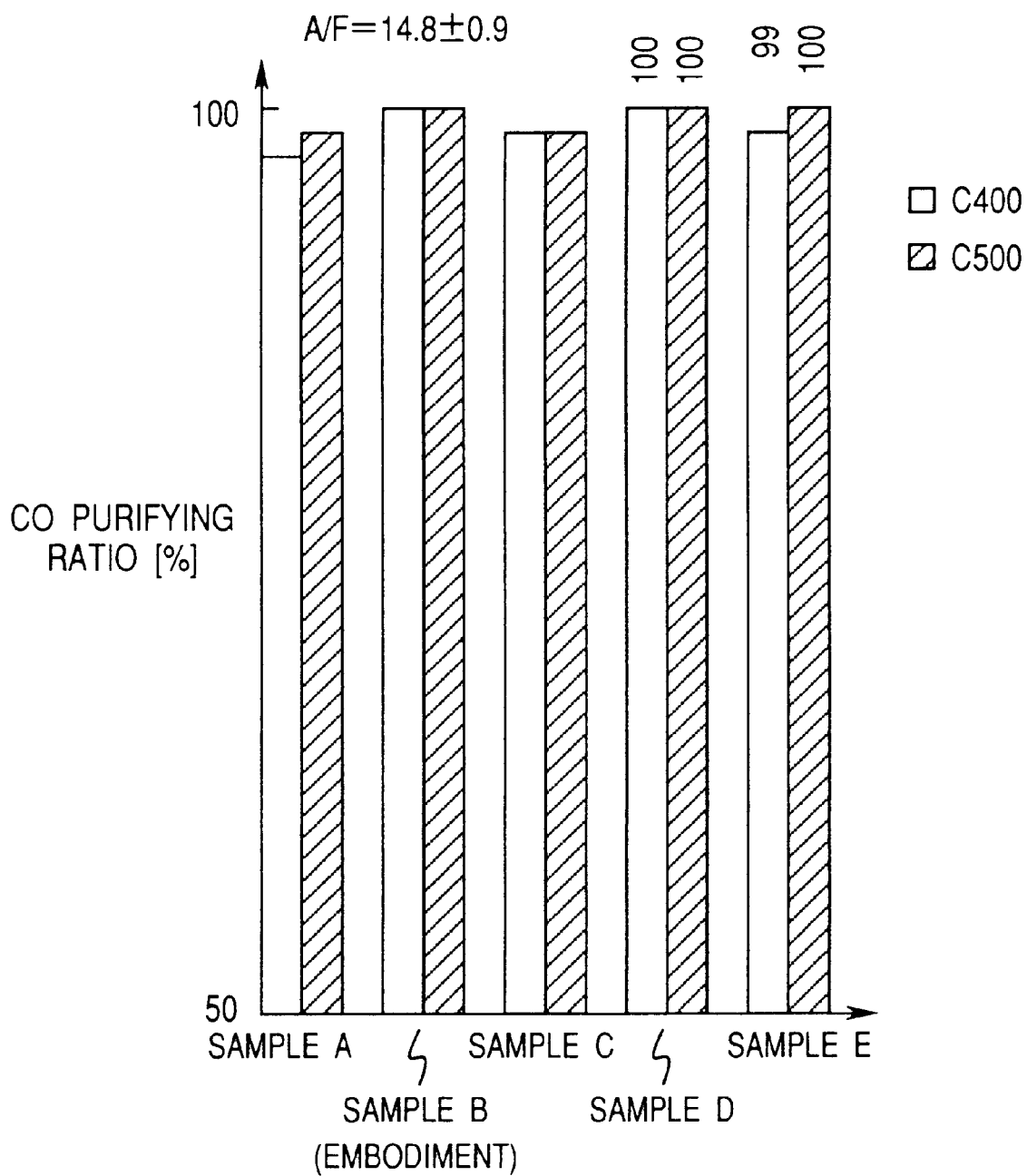
FIG. 20 is a diagram showing C400 purifying ratio and C500 purifying ratio of exhaust gas purifying catalysts (sample B) according to the embodiment 2 with respect to CO in contrast with comparison examples (sample A, C, D, E)

FIG. 20 shows the results of another rig evaluation test carried out on samples A–E, indicating C400 purifying ratio and C500 purifying ratio with respect to CO for samples A–E when the exhaust gas corresponds to the case when the air-fuel ratio A/F=14.8±0.9. Each sample A–E was heat-treated by exposing it to 1000° C. atmosphere for 24 hours for confirming the high-temperature heat resistance.

As shown in FIG. 20, both C400 and C500 purifying ratios with respect to CO apparently increase in sample B, the exhaust gas purifying catalyst according to this invention, as compared to sample A or sample C, exhaust gas purifying catalysts not according to this invention. In sample B, as compared to samples D–E, the C500 purifying ratio is nearly equivalent, and C400 purifying ratio is satisfactory (sample E) or equivalent (sample D). Consequently, the exhaust gas purifying catalyst according to this invention provides excellent CO purifying performance.

That is, sample B, the exhaust gas purifying catalyst according to this invention, achieves the purifying performance (HC, CO, NOx) in both low and high temperatures simultaneously after high-temperature resistance treatment. In order to secure low-temperature purification of NOx, rhodium must be contained in the upper catalyst layer. In the exhaust gas purifying catalyst according to this invention, the impurity content is preferably less than 1 wt %. In this case, the exhaust gas purifying performance of the exhaust gas purifying catalyst is still more improved.

Figure 21:
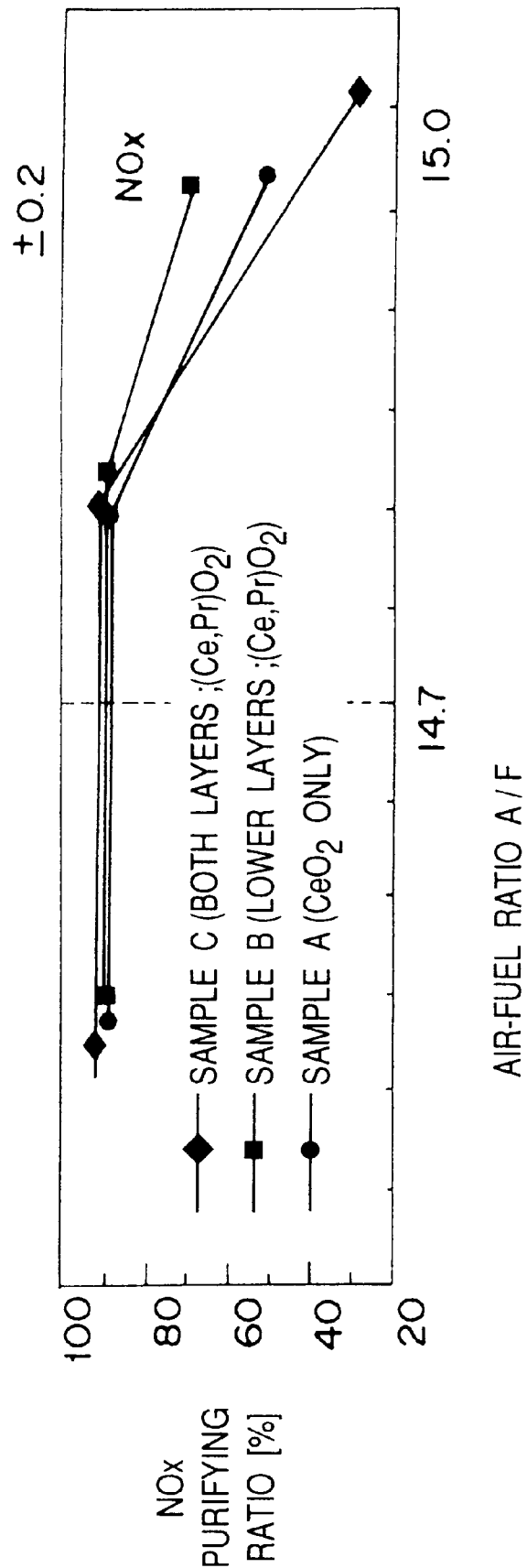
FIG. 21 is a diagram showing NOx purifying ratio of exhaust gas purifying catalysts (sample B) according to the embodiment 2 with respect in contrast with comparison examples (sample A, C)

FIG. 21 shows the results of still another rig evaluation test with respect to samples A–C, and indicates the purifying ratio at 460° C. with respect to NOx for samples A–C when the air-fuel ratio amplitude of the exhaust gas is fixed to ±0.2 and the air-fuel ratio A/F is varied in various forms. The space velocity of exhaust gas is set to 100,000 h$^{-1}$.

As shown in FIG. 21, the NOx purifying ratio at 460° C. is equivalent or higher in sample B, the exhaust gas purifying catalyst according to this invention, as compared to sample A or sample C, exhaust gas purifying catalysts not according to this invention. In particular, in the slightly lean area where the air excess ratio γ exceeds 1 (A/F exceeds 14.7), the NOx purifying ratio of sample B greatly increases, as compared to sample A or sample C. Consequently, it is apparent that the exhaust gas purifying catalyst according to this invention provides excellent NOx purifying performance, in particular, NOx purifying performance in the slightly lean area of A/F=about 15.

TABLE 1

| | Exhaust gas purifying performance | |
|---|---|---|
| | | (purifying ratio) |
| | HC | NOx |
| Sample B (Emb.) | 96.2% | 95.9% |
| Sample A (Com.) | 95.8% | 93.8% |
| Sample C (Com.) | 95.8% | — |

Table 1 shows the results of containing samples A–C in actual automobiles and testing the exhaust gas purifying performance, and indicates actual purifying ratios of HC and NOx of each vehicle with the exhaust gas purifying catalyst contained. Various test conditions in this actual automobile test are generally shown as follows.

<Test conditions>

(1) Engine type: 1.5 L, in-line 4-cylinder engine (2) Catalyst contained position: manifold right downstream of the engine (directly connected position)

(3) Catalyst heat-treatment conditions: 1000° C.×24 hr (in air)

(4) Catalyst capacity: 1.25 L (5) Evaluation mode: US FTP mode

As shown in Table 1, in the vehicle containing sample B, the exhaust gas purifying catalyst according to this invention, the HC purifying ratio is apparently improved as compared to the vehicles containing sample A or sample C. In the vehicle containing sample B, the NOx purifying ratio is improved as compared to the vehicle containing sample A, the conventional exhaust gas purifying catalyst. Consequently, the exhaust gas purifying catalyst according to this invention, actually provides excellent HC and NOx purifying performance as compared to the conventional exhaust gas purifying catalyst.

Now, in the exhaust gas purifying catalyst according to this invention with a basic construction in which platinum, rhodium, and cerium oxide are contained in the upper catalyst layer (platinum and rhodium, catalyst components, are supported on cerium oxide), while in the lower catalyst layer, palladium, alumina (after heat treatment), and cerium oxide (Ce, Pr) compound oxide are contained, the durability (heat resistance) has been improved as compared to the conventional exhaust gas purifying catalyst of this type, and deterioration of catalyst (thermal deterioration) is difficult to occur. When other catalyst deterioration such as poisoning deterioration or structural deterioration except the above thermal deterioration occurs in the exhaust gas purifying catalyst, a problem in that the catalyst layer is likely to be peeled from the carrier is generated.

However, the inventor of this invention has found that introducing a suitable amount of alumina ($\gamma Al_2O_3$) after heat-treatment to the upper catalyst layer of the exhaust gas purifying catalyst is able to more effectively prevent catalyst deterioration and still further improve the durability (peeling resistance) of the exhaust gas purifying catalyst.

Figure 22:
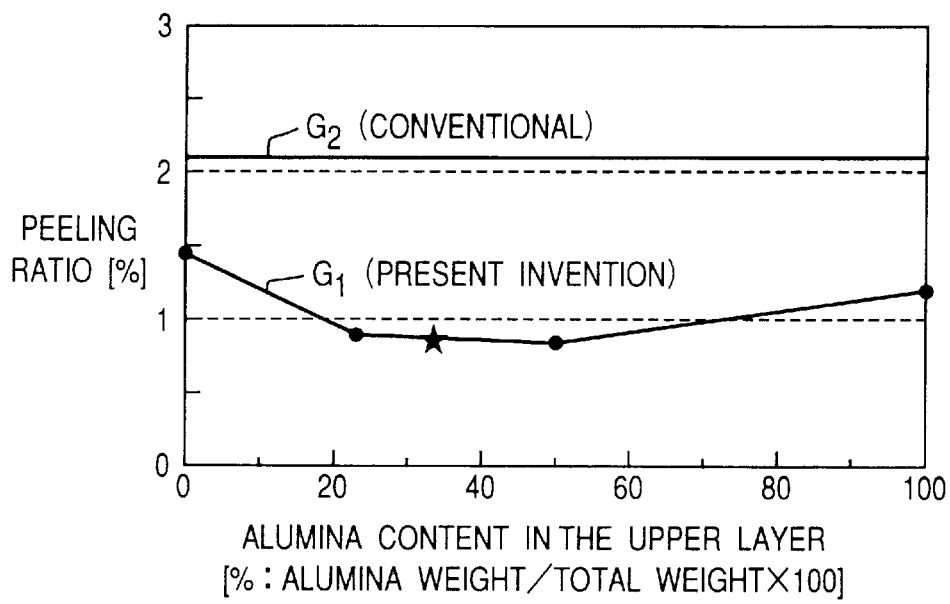
FIG. 22 is a graph showing change characteristics of peeling ratio of the catalyst layer with respect to alumina content of the upper catalytic layer in the exhaust gas purifying catalyst.

FIG. 22 shows the results obtained by carrying out ultrasonic peeling tests on the exhaust gas purifying catalysts, to the upper catalyst layer of which alumina is introduced and not introduced. Various test conditions are stated in FIG. 22. In FIG. 22, graph $G_1$ shows the relationship between the peeling ratio and alumina (after heat-treatment) content (wt %) in the upper catalyst layer, while graph $G_2$ shows the peeling ratio of conventional exhaust gas purifying catalyst of this type.

As clear from FIG. 22, where the alumina content of the upper catalyst layer is between 25 and 50 wt %, the peeling ratio is comparatively low. Consequently, in the exhaust gas purifying catalyst, setting the alumina content of the upper catalyst layer to 25–50 wt % can effectively improve the durability (heat resistance). For a specific technique for introducing alumina into the upper catalyst layer, there can be used a batch supporting technique, in which while platinum and rhodium are supported on cerium oxide, alumina (after heat treatment) is simply added or a separated supporting technique in which while platinum is supported on cerium oxide, rhodium is supported on alumina (after heat treatment).

Table 2 shows the results obtained by measuring exhaust gas purifying performance in the exhaust gas purifying catalysts, to the upper catalytic layer of which alumina is introduced or not introduced. Various evaluation conditions are stated in Table 2.

TABLE 2

| Catalyst specifications (Alumina content) | Exhaust gas purifying performance | | |
|---|---|---|---|
| | FTP on-board evaluation results - purifying ratio [%]/exhaust rate [g/mile] | | |
| | HC | CO | NOx |
| 0 wt % | 96.9/0.044 | 89.5/0.741 | 98.8/0.034 |
| 25 wt % | 96.2/0.055 | 85.5/0.986 | 99.3/0.015 |
| 50 wt % | 96.9/0.048 | 87.3/0.874 | 99.2/0.020 |

Evaluation mode: FTP

Evaluated vehicle: 1.5 L, 4-cylinder engine

Cat. containing condition: right downstream of Ex. manifold junction (direct Cat.)

Noble metal specifications: Pt/Pd/Rh=1/14/2, 5.7 g/L

Carrier condition: 1.25 L

As is clear from Table 2, the exhaust gas purifying performance of the exhaust gas purifying catalyst to the upper catalyst layer of which alumina is introduced is nearly equivalent to that of the exhaust gas purifying catalyst with no alumina introduced.

The inventor of this invention has found that in the exhaust gas purifying catalyst according to this invention, replacing part of cerium oxide with pulverized cerium oxide (hereinafter called "fine ceria") for the upper and the lower catalyst layers, respectively, that is, pulverizing part of cerium oxide, is able to further improve the initial performance and durability (heat resistance) of the exhaust gas purifying catalyst.

Figure 23:
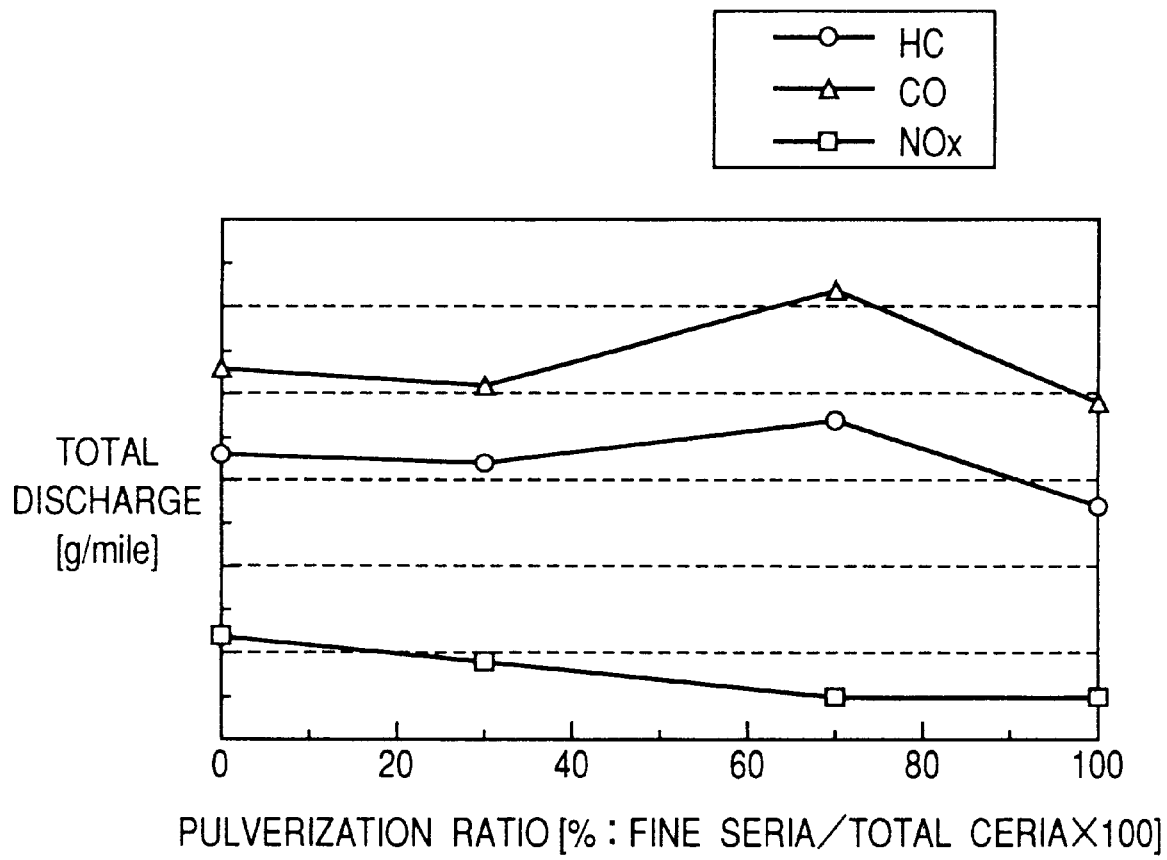
FIG. 23 is a graph showing change characteristics of exhaust gas purifying performance of the exhaust gas purifying catalyst with respect to cerium oxide degradation ratio.

FIG. 23 shows the results obtained by measuring change characteristics of the exhaust gas performance to the pulverization ratio of cerium oxide in the exhaust gas purifying catalyst.

Various evaluation conditions are stated in FIG. 23. In FIG. 23, the exhaust gas purifying performance is expressed by the discharge rate of atmospheric pollutants per 1 mile when the vehicle is running. According to FIG. 23, it is assumed suitable to set the pulverization ratio of cerium oxide to 40% or lower.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An exhaust gas purifying catalyst comprising cerium oxide which supports palladium, and a compound oxide of cerium and praseodymium.

2. The exhaust gas purifying catalyst according to claim 1, wherein the catalyst comprises a catalytic layer including the cerium oxide, the palladium supported by the cerium oxide and the compound oxide of cerium and praseodymium, and a carrier supporting the catalytic layer.

3. The exhaust gas purifying catalyst according to claim 1, wherein the weight ratio of the cerium oxide to the compound oxide is equal to or less than 9/1.

4. The exhaust gas purifying catalyst according to claim 1, wherein the weight ratio of the cerium oxide to the compound oxide is equal to or more than 7/3.

5. The exhaust gas purifying catalyst according to claim 1, wherein the weight ratio of the cerium oxide to the compound oxide is between 9/1 and 7/3.

6. The exhaust gas purifying catalyst according to claim 1, wherein the ratio of praseodymium to the cerium in the compound oxide is between 3–50 mol %.

7. The exhaust gas purifying catalyst according to claim 2, wherein the ratio of praseodymium to the cerium in the compound oxide is between 3–50 mol %.

8. The exhaust gas purifying catalyst according to claim 3, wherein the ratio of praseodymium to the cerium in the compound oxide is between 3–50 mol %.

9. The exhaust gas purifying catalyst according to claim 4, wherein the ratio of praseodymium to the cerium in the compound oxide is between 3–50 mol %.

10. The exhaust gas purifying catalyst according to claim 5, wherein the ratio of praseodymium to the cerium in the compound oxide is between 3–50 mol %.

11. The exhaust gas purifying catalyst according to claim 10, wherein the ratio of praseodymium to the cerium in the compound oxide is between 3–20 mol %.

12. The exhaust gas purifying catalyst according to claim 11, wherein the ratio of praseodymium to the cerium in the compound oxide is between 5–20 mol %.

13. The exhaust gas purifying catalyst according to claim 12, wherein the ratio of praseodymium to the cerium in the compound oxide is between 5–7 mol %.

14. The exhaust gas purifying catalyst according to claim 1, wherein the compound oxide is mixed with the cerium oxide.

15. The exhaust gas purifying catalyst according to claim 1, wherein a mixture comprising palladium, cerium oxide, compound oxide of cerium and praseodymium, and hydrated alumina is coated onto a carrier.

16. The exhaust gas purifying catalyst according to claim 1, comprising a first catalytic layer containing palladium as a catalytic component and a second catalytic layer containing at least one of platinum and rhodium as a catalytic component, wherein the first catalytic layer only contains said cerium oxide compound and said compound oxide of cerium and praseodymium.

17. An exhaust gas purifying catalyst comprising cerium oxide and a compound oxide of cerium and praseodymium wherein both said cerium oxide and said compound oxide support palladium.

18. An exhaust gas purifying catalyst which comprises at least one of platinum and rhodium as a catalytic component, a compound oxide of cerium and praseodymium, with the compound oxide arranged in such a manner so as to prevent contact with at least one of said platinum and rhodium;

wherein a first catalytic layer comprises a mixture of the palladium, the cerium oxide and the compound oxide of cerium and praseodymium while a second catalytic layer comprises a mixture of the cerium oxide supporting at least one of the platinum and the rhodium.

19. An exhaust gas purifying catalyst which comprises at least one of platinum and rhodium as a catalytic component, a compound oxide of cerium and praseodymium, with the compound oxide arranged in such a manner so as to prevent contact with at least one of said platinum and rhodium;

wherein, a first catalytic layer comprises a mixture of the cerium oxide supporting palladium, and the compound oxide of cerium and praseodymium, while a second catalytic layer contains the cerium oxide supporting at least one of the platinum and the rhodium.

* * * * *